United States Patent [19]

Kurihara et al.

[11] Patent Number: 6,072,478
[45] Date of Patent: *Jun. 6, 2000

[54] SYSTEM FOR AND METHOD FOR PRODUCING AND DISPLAYING IMAGES WHICH ARE VIEWED FROM VARIOUS VIEWPOINTS IN LOCAL SPACES

[75] Inventors: Tsuneya Kurihara, Tokyo; Jyoji Nishiyama, Urawa; Haruo Takeda, Kawasaki, all of Japan

[73] Assignee: Hitachi, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/602,316

[22] Filed: Feb. 16, 1996

[30] Foreign Application Priority Data

Apr. 7, 1995 [JP] Japan .................................. 7-082610

[51] Int. Cl.⁷ .................................................. G06T 15/00
[52] U.S. Cl. ............................................ 345/302; 345/473
[58] Field of Search .......................... 345/302, 473–475, 345/419, 427

[56] References Cited

U.S. PATENT DOCUMENTS

| | | | |
|---|---|---|---|
| 5,307,456 | 4/1994 | MacKay .................................. | 345/328 |
| 5,347,624 | 9/1994 | Takanashi et al. ...................... | 345/435 |
| 5,386,581 | 1/1995 | Suzuki et al. ........................... | 707/515 |
| 5,414,801 | 5/1995 | Smith et al. ............................. | 345/419 |
| 5,479,597 | 12/1995 | Fellous ................................... | 345/302 |
| 5,553,221 | 9/1996 | Reimer et al. .......................... | 345/333 |
| 5,566,280 | 10/1996 | Fukui et al. ............................. | 345/419 |
| 5,577,960 | 11/1996 | Sasaki ...................................... | 463/32 |
| 5,616,079 | 4/1997 | Iwase et al. .............................. | 463/32 |
| 5,644,694 | 7/1997 | Appleton ................................. | 345/474 |
| 5,659,323 | 8/1997 | Taylor ..................................... | 348/159 |
| 5,666,554 | 9/1997 | Tanaka .................................... | 345/302 |
| 5,675,695 | 10/1997 | Hirayama et al. ....................... | 386/95 |
| 5,680,619 | 10/1997 | Gudmundson et al. ................ | 395/701 |
| 5,684,943 | 11/1997 | Abraham et al. ....................... | 395/173 |
| 5,689,437 | 11/1997 | Nakagawa ............................ | 364/514 A |
| 5,689,618 | 11/1997 | Gasper et al. .......................... | 395/2.85 |
| 5,696,905 | 12/1997 | Reimer et al. .......................... | 395/227 |

OTHER PUBLICATIONS

Drucker et al., "CINEMA: a system for procedural camera movements", Computer Graphics, v. 25, pp. 67–70, Mar. 1992.

Jung et al., "Animated human agents with motion planning capability for 3D–space postural goals", J. of Visualization and Computer Animation, v. 5, pp. 225–246, Oct. 1994.

McGillivray, "StoryBoard Artist 1.5", MacWorld, v. 12, n. 10, p. 91, Oct. 1995.

(List continued on next page.)

*Primary Examiner*—Stephen S. Hong
*Attorney, Agent, or Firm*—Antonelli, Terry, Stout & Kraus, LLP

[57] ABSTRACT

An image producing/displaying system which is capable of imaging the drama, which is generally developed, from different views independently includes a storage device and an information processing unit for progressing the drama on the basis of the data stored in the storage device to image the drama. The storage device stores previously therein both individual data with respect to a plurality of characters which are treated as the human beings, a plurality of set and properties which are treated as the objects, and a plurality of local spaces, which are virtually specified as elements constructing the virtual world, and scenario information which is used to progress the drama in the whole virtual world. The information processing unit reads out the scenario information from the storage device to progress the drama in the whole space of the virtual world in accordance with the description in the scenario, and images the contents of the drama shown by the scenario information describing the drama in the specified local space out of the plurality of local spaces to display the contents of the drama on a display device by referring to the individual data stored in the storage device.

22 Claims, 24 Drawing Sheets

OTHER PUBLICATIONS

Roach, "Interactive movie takes top honors at QuickTime Film Festival", Hyperbole Studios Press Release, Jun. 3, 1992.

"Seybold San Francisco '92: A Progress Report", Seybold Report on Desktop Publishing, v. 7, n. 3, p. 1, Nov. 2, 1992.

Boisseau, "The Bard of CD–ROM", Houston Chronicle, pp. 4A–4B, Oct. 5, 1992.

Said, "Apple troops out set–top", MacWeek, v. 9, n. 16, p. 1, Apr. 17, 1995.

Stanley, "Steps, roads, funnels, galaxies: metaphors for designing interactive presentations", T.H.E. Journal, v. 22, n. 5, p. 57(5), Dec. 1994.

Badler et al., "TEMPUS: a system for the design and simulation of human figures in a task–oriented environment", ISA 1985—Paper #85–0347, pp. 251–257, Jan. 1985.

Karp et al., "Automated presentation planning of animation using task decomposition with heuristic reasoning", Graphics Interface '93, pp. 188–127, May 1993.

Drucker et al., "Intelligent Camera Control in a Virtual Environment", Graphics Interface '94, pp. 190–199, May 1994.

Faigle et al., "Integrating virtual environments with high performance computing", IEEE Virtual Reality Annual International Symposium (VRAIS '93), pp. 62–68, Sep. 1993.

Giuffrida et al., "Cooperation and collaboration between actors and virtual models on stage", Proc. of 3rd IEEE Intl. Workshop on Robot and Human Communication, pp. 68–71, Jul. 1994.

Kanade et al., "Virtualized reality: concepts and early results", Proc. of IEEE Workshop on Representation of Visual Scenes, pp. 69–76, Jun. 1995.

Magnenat–Thalmann et al., "Virtual Actors Living in a Real World", Computer Animation '95, pp. 19–29, 210, Apr. 1995.

Moezzi et al., "Immersive Video", Proc. of IEEE 1996 Virtual Reality Annual Intl. Symposium, pp. 17–24, 265, Mar. 1996.

Jain et al., "Multiple Perspective Interactive Video", http://vision.ucsd.edu/papers/mpiv–ieee–mm, Apr. 3, 1995.

Ware et al., "Exploration and Virtual Camera Control in Virtual Three Dimensional Environments", Computer Graphics, v. 24, n. 2, pp. 175–183, Mar. 1990.

FIG. 7A

| SCENE | SPACE | | | L1 | L2 | L3 | L4 | L5 |
|---|---|---|---|---|---|---|---|---|
| 1 | W/DISAPPROVAL OF SPECIFICATION | EVENT | | A,B,C: UNDER PHOTOGRAPHING IN COCKPIT | — | D: UNDER WORK | E: TAKE SPACE WALK OUTSIDE SPACE CRAFT | F,G: WATCHING OF MONITOR |
| | | CAMERA | | DISPLAY OUTER APPEARANCE OF SPACE CRAFT TOGETHER WITH FARAWAY EARTH | — | — | — | — |
| | | SPEECH | | — | — | — | — | — |
| | | SOUND | | TITLE MUSIC | | | | |
| 2 | L1/APPROUCH OF SPECIFICATION | EVENT | | A,B,C: COCKPIT A: STAND BEFORE MICROPHONE | OCCUR-RENCE OF FIRE | D: LISTEN TO INSTRUCTION OF A, PREPARATION FOR TAKING SPACE WALK | E: EXTRA-VEHICULAR WORK | F,G: WATCHING OF MONITOR |
| | | CAMERA | | COMPLETE VIEW | COMPLETE VIEW | COMPLETE VIEW | ZOOM UP E | COMPLETE VIEW |
| | | SPEECH | | A: "D, GO OUT FROM SPACE CRAFT AND HELP E" | | | | |
| | | SOUND | | ALARM SOUND, FIRE OCCURRENCE ANNOUNCEMENT | FIRE CRACKING SOUND | SOUND ACCOMPANYING PREPARATION ACTION | | INDOOR NOISE, ALARM SOUND |

FIG. 7B

| | L1 · L2 ALTERNATION/ APPROVAL OF SPECIFICATION | | | | | |
|---|---|---|---|---|---|---|
| EVENT | A: INSTRUCT B AND C TO EXTINGUISH FIRE WITH STRAINED FACE | APPEARANCE OF ALIEN, APPEARANCE OF B AND C | D: PREPARATORY WORK | E: EXTRAVEHICULAR WORK | F: HANDLING OF MONITOR, G: CHECKING OF MANUAL | |
| CAMERA | ZOOM UP A | COMPLETE VIEW | ZOOM UP D | ZOOM UP E | ZOOM UP F AND G | |
| SPEECH | A: "B AND C, EXTINGUISH FIRE" | B AND C: SCREAM | D: "E, IT'S ALIEN," E: "O.K." | D: "E, IT'S ALIEN," E: "O.K." | F: [...] G: [...] | |
| SOUND | ALARM SOUND | APPEARANCE OF ALIEN, THEME MUSIC | AIR EXHAUST SOUND | | ALARM SOUND, INDOOR NOISE | |

| | W/DISAPPROVAL OF SPECIFICATION | | | | | |
|---|---|---|---|---|---|---|
| EVENT | SPACE CRAFT APPROACHES EARTH | | | | | |
| CAMERA | WHOLE SPACE CRAFT AND EARTH | | | | | |
| SPEECH | — | | | | | |
| SOUND | ENDING MUSIC | | | | | |

SYSTEM FOR AND METHOD FOR PRODUCING AND DISPLAYING IMAGES WHICH ARE VIEWED FROM VARIOUS VIEWPOINTS IN LOCAL SPACES

BACKGROUND OF THE INVENTION

The present invention relates in general to an image producing/displaying system and an image producing/displaying method which are used to virtually produce a virtual world and to develop a drama, which is made occur therein, along a scenario which is previously prepared and to image the drama of interest to display the drama of interest.

Heretofore, in a moving picture and the like, the characters play the parts along the story which is previously determined to progress a drama. In the moving picture for example, the various scenes are photographed along the scenario and those scenes are subjected to the cutting process to construct an image work. This is applied to the dramas in the television except that the video tape is used as the recording medium instead of the films. In addition, in the case of the animation as well, the original picture is produced every scene along the scenario and then is imaged to be recorded in the video tape for example, and the original picture thus recorded in the video tape is subjected to the cutting process, thereby constructing the image work.

In the case of the moving picture for example, the reproduction of such a conventional image work is carried out in such a way that the picture on the film is projected on a screen to display the moving image on the screen while feeding the film successively by a moving picture projector. In the case of the television, for example, the reproduction is carried out in such a way that the video tape is reproduced by the VTR to display an image on a monitor. This is also applied to the animation.

When analyzing such a conventional image display system, it is understood that the following feature is present. That is, in the conventional system, the reproduced image can be viewed only from a view which is specified by the manufacturer. This results from the fact that the scenario itself was written on the assumption that the story written in the scenario is viewed from a certain view, and the image is also manufactured in accordance with the scenario. Therefore, the reproduced image is necessarily forced to be viewed from a given view. For example, the drama about a fugitive and a pursuer is now assumed. In such a drama, in the conventional image displaying system, the drama is described on the fugitive side at a certain time point and the drama is developed on the pursuer side at another time point, and those stories are alternately provided to construct generally the drama. Then, a viewer who views the drams thus produced admires the drama as produced.

Now, in recent years, as the multi-media has been developed, the user is not satisfied with that the information is simply given in a one-side manner and hence desires that the access can be carried out so as to positively obtain the information which the user wants to know by his/her own accord. It is considered that this is also applied to the world in the drama. In other words, it is considered that the user has the potential demand that the user wants to view the drama from a view, which is specified by the user, as well as from a view given by the manufacturer. For example, in the case of the above-mentioned drama about the fugitive and the pursuer, by viewing the drama from a standpoint only on one side, it is expected that a feeling of identification with the character in the specified place will be increased. More specifically, if viewing the drama from a view of the fugitive, the user will be able to more deeply sympathize with both a mental state and a thrill of the fugitive who intends to abscond from the pursuer while being frightened at the unvisible pursuer. On the other hand, if standing at a point of view on the pursuer side, the user will be able to more deeply feel the real pleasure of solving the enigma in which the pursuer, i.e., the user pursues the fugitive while locating the fugitive's whereabouts.

In the conventional moving picture, however, it is difficult to realize such a demand. The reason is firstly that the potential requirement for the production and the display of such a new image is not picked up. Secondly, that reason is that such a new manufacturer's way of thinking is not present. Thirdly, that reason is that any system for use therein is not present.

As for other examples of the image producing/displaying system, refer to an article of "access", summer 1994, vol. 8, No. 2 and an article of "SIGGRAPH 94 Visual Proceedings" pp. 218 to 267.

SUMMARY OF THE INVENTION

It is therefore an object of the present invention to provide an image producing/displaying system and an image producing/displaying method which are capable of imaging a drama, which is generally developed, from different views independentally of one another.

According to an aspect of the present invention, an image producing/displaying system for producing virtually a virtual world, developing a drama, which is made occur therein, in accordance with a scenario which is previously prepared, and imaging the drama to display the drama includes:

storage means for storing therein information which is necessary to construct the virtual world and also to process the drama;

information in processing means for processing the drama in the virtual world and imaging the drama on the basis of the information stored in the storage means;

output means for displaying the image which has been produced in the information processing means; and input means for inputting an instruction to the information processing means, the storage means serving to store individual data with respect to a plurality of characters which can conduct themselves like human beings and hence are treated as the human beings, a plurality of sets of properties which are treated as the objects and a plurality of local spaces where the plurality of characters and the plurality of sets of properties can be present, which are virtually specified as elements constructing the virtual world, and to store scenario information as information used to construct a story along which the drama is processed in the whole virtual world, the information processing means including:

progression managing means for reading out the scenario information to process the drama in the whole space of the virtual world in accordance with the scenario; and image producing means for producing, by referring to the individual data, with respect to the information relating to the local space of the virtual world, which has been specified, out of the scenario information the progression of which is managed by the progression managing means, an image of the constituent elements of the virtual world contained in the individual data to display the image by the output means.

According to another aspect of the present invention, an image producing/displaying system for producing virtually a virtual world, developing a drama, which is made occur therein, in accordance with a scenario which is previously prepared, and imaging the drama to display the drama, the system includes:

a storage device for storing therein information which is necessary to construct the virtual world and also to process the drama;

an information processing unit for processing the drama in the virtual world and imaging the drama on the basis of the information stored in the storage means;

a display device for displaying the image which has been produced in the information processing unit; and an input unit for inputting an instruction to the information processing unit, the storage device serving to store individual data with respect to a plurality of characters which demonstrate human characteristics and hence are treated as the human beings, a plurality of sets of properties which are treated as the objects and a plurality of local spaces where the plurality of characters and the plurality of sets of can be present, which are virtually specified as elements constructing the virtual world, and to store scenario information as information used to construct a story along which the drama is processed in the entire virtual world, the information processing unit including:

progression managing means for reading out the scenario information to process the drama in the entire space of the virtual world in accordance with the scenario; and image producing means for producing, by referring to the individual data, with respect to the information relating to the local space of the virtual world, which has been specified, out of the scenario information the progression of which is managed by the progression managing means, an image of the constituent elements of the virtual world contained in the individual data to display the image by the display device.

According to still another aspect of the present invention, an image producing/displaying method of producing virtually a virtual world, developing a drama, which is made occur therein, in accordance with a scenario which is previously prepared, and imaging the drama to display the drama, the method includes the steps of:

storing previously both individual data with respect to a plurality of characters which demonstrate human characteristics and hence are treated as the human beings, a plurality of sets of properties which are treated as the objects, and a plurality of local spaces where the plurality of characters and the plurality of sets of properties are present, which are virtually specified as elements constructing the virtual world, and scenario information as information which is used to construct a story along which the drama is processes in the entire virtual world in a storage device;

reading out the scenario information from the storage device to progress the drama in the entire space of the virtual world in accordance with the scenario; and imaging the contents of the drama shown by the scenario information describing the drama in the local space, which has been specified, out of the plurality of local spaces by referring to the individual data which is stored in the storage device to display the contents of the drama on a display device.

In addition, according to a third aspect of the present invention, an image producing/displaying system for producing virtually a virtual world, developing a drama, which is made occur therein, in accordance with a scenario which is previously prepared, and imaging the drama to display the drama, the system includes:

means for storing both individual data which is used to describe both special features of a plurality of local spaces and individual special features of characters and objects appearing in the virtual world, which construct the virtual world, and scenario information as information which is used to construct a story along which the dramas with respect to a plurality of predetermined characters are progressed;

progression managing means for reading out the scenario information to produce the drama for every character in accordance with the scenario and to process those dramas synchronously with one another;

viewed character specifying means for specifying the characters to be imaged in the virtual world; and image producing means for producing, by referring to the individual data, with respect to the information of a part of the drama relating to the specified character, out of the scenario information the processing of which is managed by the progression managing means, an image of the constituent elements of the virtual world included in the individual data to display the image by a display device.

According to a further aspect of the present invention, an image producing/displaying system for virtually producing a virtual world, developing a drama, which occurs therein, in accordance with a scenario which is previously prepared, and imaging the drama to display the drama, the system includes:

an image information providing system for providing image information; and one or more viewing systems connected to the image information providing system for producing and displaying an image on the basis of the image information which has been provided from the image information providing system, the image information providing system including:

a first storage device for storing information which is necessary to construct the virtual world and also to process the drama;

a first information processing unit for executing the processing of sending information, which is used to process the drama in the virtual world and also to image the drama of interest, to the associated viewing system (s) on the basis of the information stored in the first storage device; and a first communication control unit for carrying out the communication, the first storage device storing individual data with respect to a plurality of characters which display human characteristics, a plurality of sets of properties which are treated as the objects and a plurality of local spaces where the plurality of characters and the plurality of sets of properties can be present, which are virtually specified as elements of the virtual world, and storing scenario information as information which is used to construct a story along which the drama is processed in the whole virtual world, the first information processing unit including progression managing means for reading out the scenario information and processing the drama in the entire space of the virtual world in accordance with the scenario, the viewing system including:

a second storage device for storing the information which has been sent from the image information providing system;

a second information processing unit for processing the imaging of the drama on the basis of the information which has been sent from the image information providing system;

a display device for displaying an image which has been produced in the second information processing unit;

an output unit for inputting an instruction to the second information processing unit; and a second communication control unit for carrying out the communication, the second information processing unit including image producing means for producing, by referring to the individual data, with respect to the information relating to the specified local space in the virtual world out of the scenario information the processing of which is managed in the processing managing means of the first information processing unit, an image of the constituent elements of the virtual world contained in the individual data and displaying the image on the display device.

According to another aspect of the present invention, an image producing/displaying system for virtually producing a virtual world, developing a drama, which occurs therein, along a previously prepared scenario which is, and imaging the drama to display the drama, the system includes:

an image information providing system for providing image information; and one or more viewing systems connected to the image information providing system for producing and displaying an image on the basis of the image information which has been provided from the image information providing system, the image information providing system including:

a first storage device for storing information which is necessary to construct the virtual world for putting the drama on the screen and to process the drama;

a first information processing unit for sending the information stored in the first storage device for imaging the drama to the associated viewing system(s) in accordance with a request issued from the associated viewing system(s); and a first communication control unit for carrying out the communication, the first storage device storing individual data with respect to a plurality of characters which display human characteristics, a plurality of sets of properties which are treated as the objects and a plurality of local spaces where the plurality of characters and the plurality of sets of properties can be present, which are virtually specified as elements of the virtual world, and storing scenario information as information which is used to construct a story along which the drama is processed in the whole virtual world, the viewing system including:

a second storage device for storing the information which has been sent from the image information providing system;

a second information processing unit for receiving the information which has been sent from the image information providing system to store the information thus sent thereto in the second storage device and also imaging the drama on the basis of such information;

a display device for displaying the image which has been produced in the second information processing unit;

an input unit for inputting an instruction to the second information processing unit; and a second communication control unit for carrying out the communication, the second information processing unit including:

progression managing means for reading out the scenario information to process the drama in the whole space of the virtual world in accordance with the scenario; and image producing means for producing, by referring to the individual data with respect to the information relating to the local space of the virtual world which has been specified, out of the scenario information the progression of which is managed by the progression managing means, an image of the constituent elements of the virtual world included in the individual data to display the image by the display device.

According to still another aspect of the present invention, an image producing/displaying system for virtually producing a virtual world, developing a drama, which occurs therein, along a previously prepared scenario, and imaging the drama to display the drama, the system includes:

means for storing both individual data which is used to describe both special features of a plurality of local spaces, and individual special features of characters and objects appearing in the virtual world, which construct the virtual world, and scenario information which is used to construct a story along which the dramas are processed with respect to a plurality of predetermined characters;

progression managing means for reading out the scenario information to produce the drama with every local space being in accordance with the description of the scenario and to process those dramas synchronously with one another;

imaged space appointing means for specifying the local space to be imaged in the virtual world; and image producing means for producing, by referring to the individual data with respect to the information relating to the specified local space out of the scenario information the progression of which is managed by the progression managing means, an image of the constituent elements of the virtual world included in the individual data to display the image by the display device.

In addition, according to a seventh aspect of the present invention, an image producing/displaying system for virtually producing a virtual world, developing a drama, which occurs therein, along a previously prepared scenario, and imaging the drama to display the drama, the system includes:

means for storing both individual data which is used to describe both special features of a plurality of local spaces and individual special features of characters and objects appearing in the virtual world, which construct the virtual world, and scenario information which is used to construct a story along which the dramas with respect to a plurality of predetermined characters are processed;

progression managing means for reading out the scenario information to produce the drama with every local space being in accordance with the description of the scenario and to process those dramas synchronously with one another;

virtual camera specifying means for specifying both a position and a direction of a virtual camera which is virtually specified when imaging in the virtual world; and image producing means for producing, by referring to the individual data with respect to the information relating to the local space where the position of the virtual camera thus specified is present, out of the scenario information the progression of which is managed by the progression managing means, an image being observed in accordance with the direction of the virtual camera thus specified to display the image by the display device.

In one aspect of the present invention, the space which is used to make the drama occur is virtually specified. Then, that space is specified with respect to the whole world upon which the drama has an influence. That is, the virtual world is virtually specified. The drama which occurs in the virtual world is developed along the scenario which is previously prepared, imaged and displayed.

The construction of the virtual world is carried out by storing the information which is necessary to progress the drama in the storage device. For example, the individual data with respect to a plurality of characters which display human characteristics and hence are treated as humans, a plurality of sets of properties which are treated as the objects, and a plurality of local spaces where the plurality of characters and the plurality of sets of properties can be present, which are virtually specified as the constituent elements constructing the virtual world, is stored in the storage device. In addition, the scenario information is stored as the information constructing the story along which the drama is processed in the whole virtual world in the storage device.

The information processing unit processes the drama in the virtual world and also images the drama of interest on the basis of the information stored in the storage device. Therefore, the scenario information is read out and then the drama is processed in the entire space of the virtual world in accordance with the description of the scenario by the progression managing means. In addition, by the operation of the image producing means, with respect to the information relating to the specified local space of the virtual world out of the scenario information the progression of which is managed by the progression managing means, the above-mentioned individual information is referenced, and the image of the constituent elements of the virtual world contained in the individual information to display the image on the display device.

The display device displays the image which has been produced in the information processing unit. In addition, the input device is used to input the instruction to the information processing unit.

BRIEF DESCRIPTION OF THE DRAWINGS

FIGS. 7A and 7B are explanatory views showing an example of scenario information which is used in an embodiment of the present invention;

DESCRIPTION OF THE PREFERRED EMBODIMENTS

The preferred embodiments of the present invention will hereinafter be described in detail with reference to the accompanying drawings.

Each of the preferred embodiments of the present invention which will hereinbelow be described is a system for supposing a virtual world, developing a drama, which is made occur in the virtual world, on the basis of a predetermined scenario, producing an image and displaying the image thus produced. This image producing/displaying system can be realized by using a hardware system shown in FIG. 1.

Figure 1:
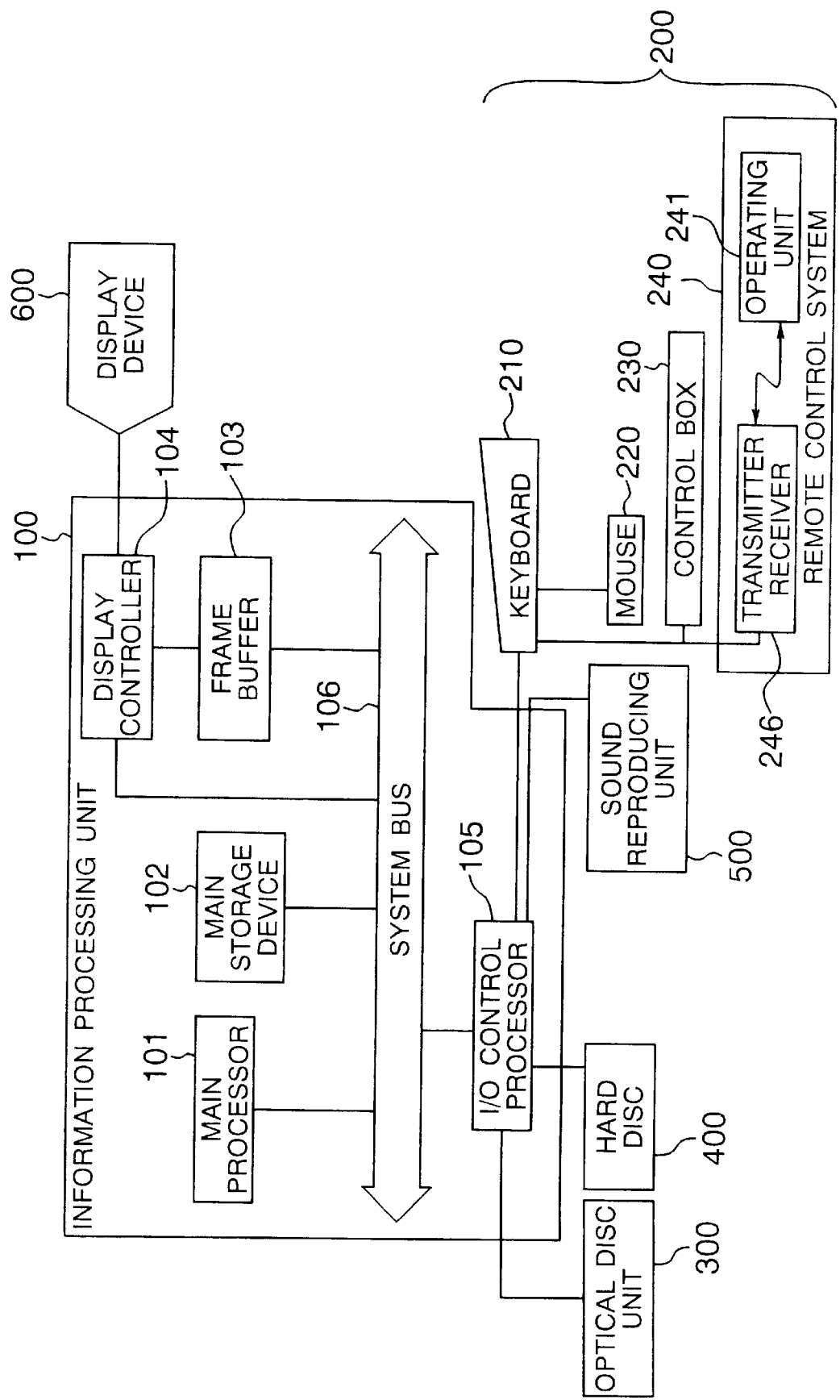
FIG. 1 is a block diagram showing a configuration of a hardware of an image producing/displaying system according to an embodiment of the present invention.

As shown in FIG. 1, a hardware system employed in the present invention includes, but is not limited to, an information processing unit 100, an input unit 200, an optical disc unit 300, a hard disc unit 400, a sound reproducing unit 500 and a display device 600.

The information processing unit 100 executes the various programs which will be described later to progress a drama, produce an image and to display the image thus produced, and also to produce the sound and reproduce the sound. Therefore, the information processing unit 100 includes a main processor 101 for executing the various processings, a main storage device 102 for storing programs and various data of the main processor 101, a frame buffer 103 for storing image data to be displayed, a display controller 104 for carrying out the control for displaying the image on the display device 600, an I/O control processor 105 for carrying out the I/O control of an I/O apparatus such as the input unit 200, and a system bus 106 for connecting between those elements.

The input unit 200 includes, but is not limited to, a keyboard 210 for inputting an instruction and the like to the information processing unit 100, a mouse 220 and a control box 230. Incidentally, the input unit 200 can includes a remote control system 240 as well as both the mouse 220 and the control box 230. In addition, the input unit 200 may include only one of the mouse 220, the control box 230 and the remote control system 240. Further, the keyboard 210 may be omitted here. The devices which are convenient in use for the viewer out of those devices will be both the control box 230 and the remote control system 240. Therefore, for example, the selectable aspect is such that in the case where such an input device is fixedly mounted to the seat, the control box 230 is employed, while the input device is not fixed to the seat but is operated by the viewer, the remote control system 240 is employed.

Figure 16:
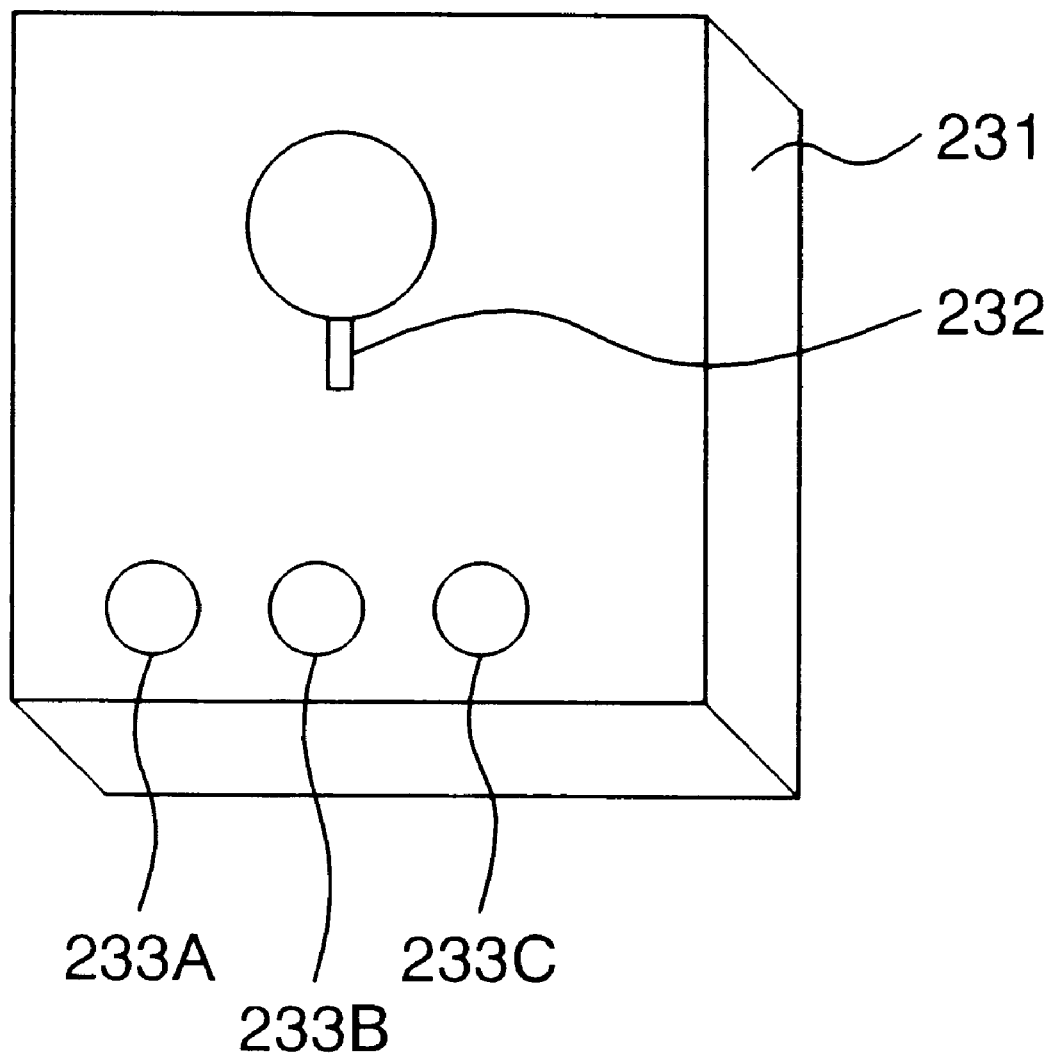
FIG. 16 is a perspective view showing a structure of a control box for specifying the position and the like of a virtual camera in an embodiment of the present invention.

As shown in FIG. 16, the control box 230 includes a box-like casing 231, a joy stick 232 which is provided at the central portion of the plane of the casing 231 so as to project therefrom, a push buttons 233A, 233B and 233C. While not illustrated in the figure, in the inside of the casing 231, there are provided a mechanism for detecting gradient angles with respect to two axis directions of the joy stick 233 to convert the data relating to those gradient angles into an electric signal to output the resultant electric signal, a switch portions which are provided in correspondence to the push buttons 233A, 233B and 233C, respectively, and a logical circuit for giving the logical sense to the scanning of the joy stick 232 on the basis of the combination of the on-off switching operation of those switch portions. In the present embodiment, the above-mentioned elements are used to specify the position, the zoom and the like of the virtual camera. In addition, the selection of the menu may be performed on the basis of the combination of the switch portions corresponding to the push buttons 233A, 233B and 233C, and the on-off operation of the switches of the switch portions. That is, the operation may be adopted in which the cursor on the display picture of the display device 600 is moved by the joy stick 232, and the soft key which is displayed on the area in which the cursor is located is selected by pressing down the push buttons 233A, 233B and 233C.

Figure 19:
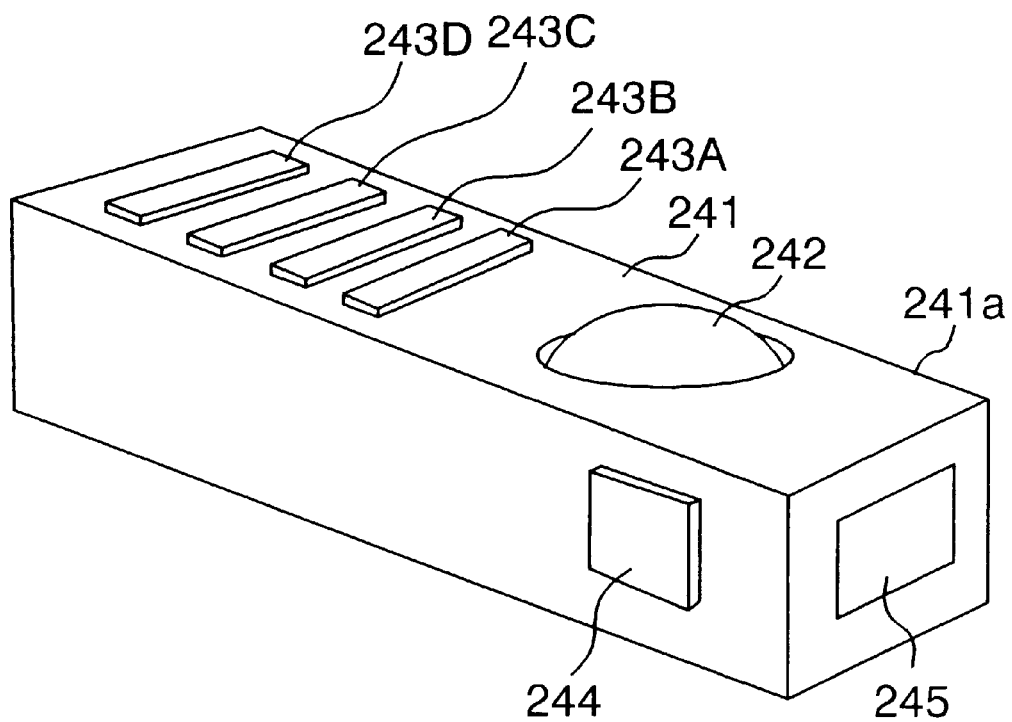
FIG. 19 is a perspective view showing a structure of an operating unit for use in the remote control which is used to specify an imaged space and to specify the position and the like of the virtual camera in an embodiment of the present invention.

The remote control system 240 includes a transmitter-receiver 246, and an operating unit 241. The transmitter-receiver 246 is connected to the information processing unit 100 to be used and transmits/receives a signal to/from the operating unit 241. For the transmission/reception of the signal, the light, the supersonic wave, the electromagnetic wave or the like is utilized. In this example, the light is utilized. As shown in FIG. 19, the operating unit 241 includes a box-like casing 241a, a track ball 242 which is provided in the vicinity of the head of the flat surface of the casing 241a, and push buttons 243A, 243B, 243C, 243D and 244. In the inside of the casing 231, while not illustrated in the figure, there are provided a mechanism which serves to detect a gradient angle with respect to the two axes of the track ball 242 to convert the gradient angle into an electric signal to output the resultant electric signal, switch portions which are provided in correspondence to the push buttons 243A, 243B, 243C, 243D and 244, a logical circuit which serves to give the scanning of the track ball 242 the logical sense on the basis of the combination of the on-off operation of the switches of those switch portions, and a transmission/reception circuit which serves to transmit/receive a signal to/from the transmitter-receiver 246 (not shown). A window 243 for transmission/reception is provided at the head of the casing 241a.

The push button 244 is used to perform click, drag and the like in combination with the motion of the track ball 242. By this operation, the push button 244 functions in the same manner as that in the mouse 220 and hence can carry out the selection of the menu, the selection of the command, and the like. In addition, by the operation of the push buttons 243A, 243B, 243C and 243D, the instruction and the like which are previously defined can be selected. Further, by the combination of the operation of the push buttons 243A, 243B, 243C and 243D and the click or drag operation by both the track ball 242 and the push button 244, the position, the zoom and the like of the virtual camera can be specified.

In the remote control system 240, in order to specify the position, without employing the track ball, the operating unit 241 may indicate the position on the display screen. For example, the remote control system 240 may be designed in such a way that both a light beam projector and a light spot detector are provided in the operating unit 241, and then a light spot is formed on the display screen of the display device by the light beam projector to indicate the position which the operating unit indicates, and also the light emitting state of the picture element in the area where the light spot is formed is detected by the light spot detector. As a result, an emission signal from the picture element which has been received by the light spot detector is sent to the transmitter-receiver through a transmission/reception circuit and then the indicated position can be obtained in correspondence to a scanning position signal in the display controller 104.

The optical disc unit 300 to which an optical disc in which the data relating to the various programs to be put on the screen in the system of the present invention is stored is mounted reproduces the data relating to the various programs. The hard disc unit 400 stores therein the programs and the various data of the main processor 101.

The sound reproducing unit 500 is a unit for reproducing the sounds such as the speech, the effect sound and the music. This sound reproducing unit 500 includes at least two pairs of amplifiers and speaker systems in order to make the stereo reproduction possible. The display device 600 is comprised of a CRT display for example. For the display device 600, the large display device such as the projection type display or multiscreen type display may also be employed. If such a large display device is employed, the force of the image will be increased. In addition, if the display device is employed in which the stereoscopic vision is possible, it will be more preferable.

Figure 4:
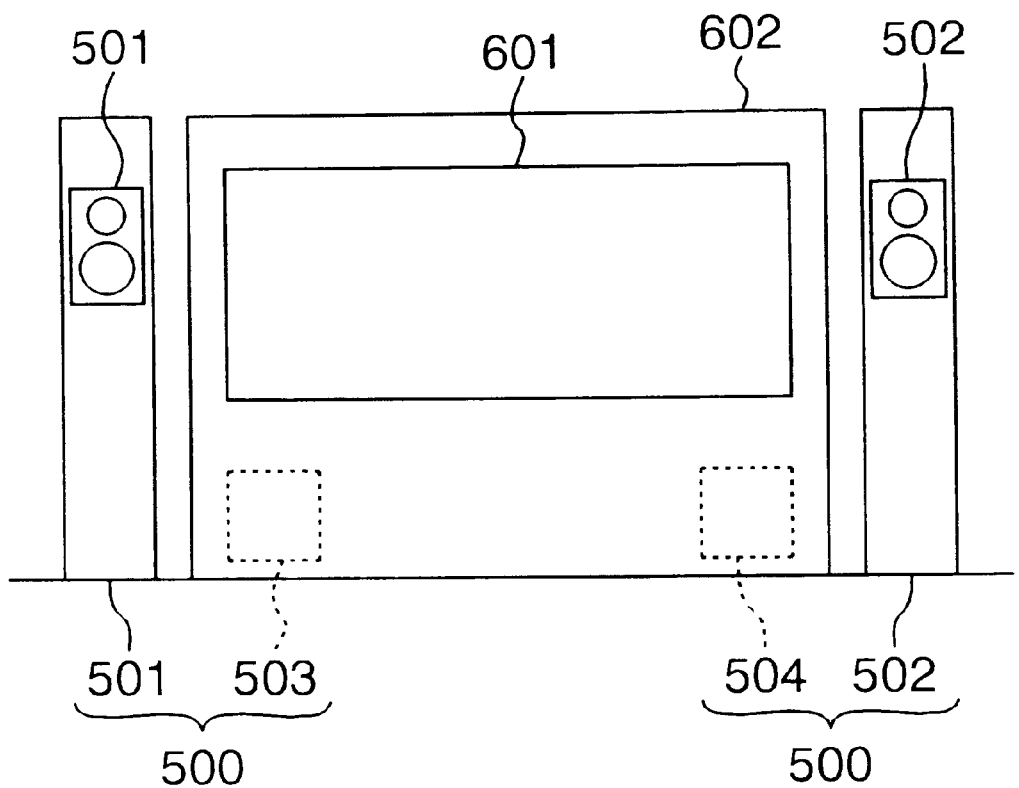
FIG. 4 is a front view showing a structure of an example of a monitoring system including a display and a sound reproducing unit.

FIG. 4 is a schematic view showing a structure of one example of the monitoring system including both the display device 600 and the sound reproducing unit 500. This example of the monitoring system shown in the figure has the display device 600 including a large screen 601 having a long side, and speaker systems 501 and 502 which are disposed on the right and left sides of the large screen 601. Amplifiers 503 and 504 for driving the speaker systems 501 and 502 are installed in the inside of the display device 600. This system may further include a center speaker system and a rear speaker system, and amplifiers therefor in order to make the reproduction of the stereophonic sound possible.

Figure 2:
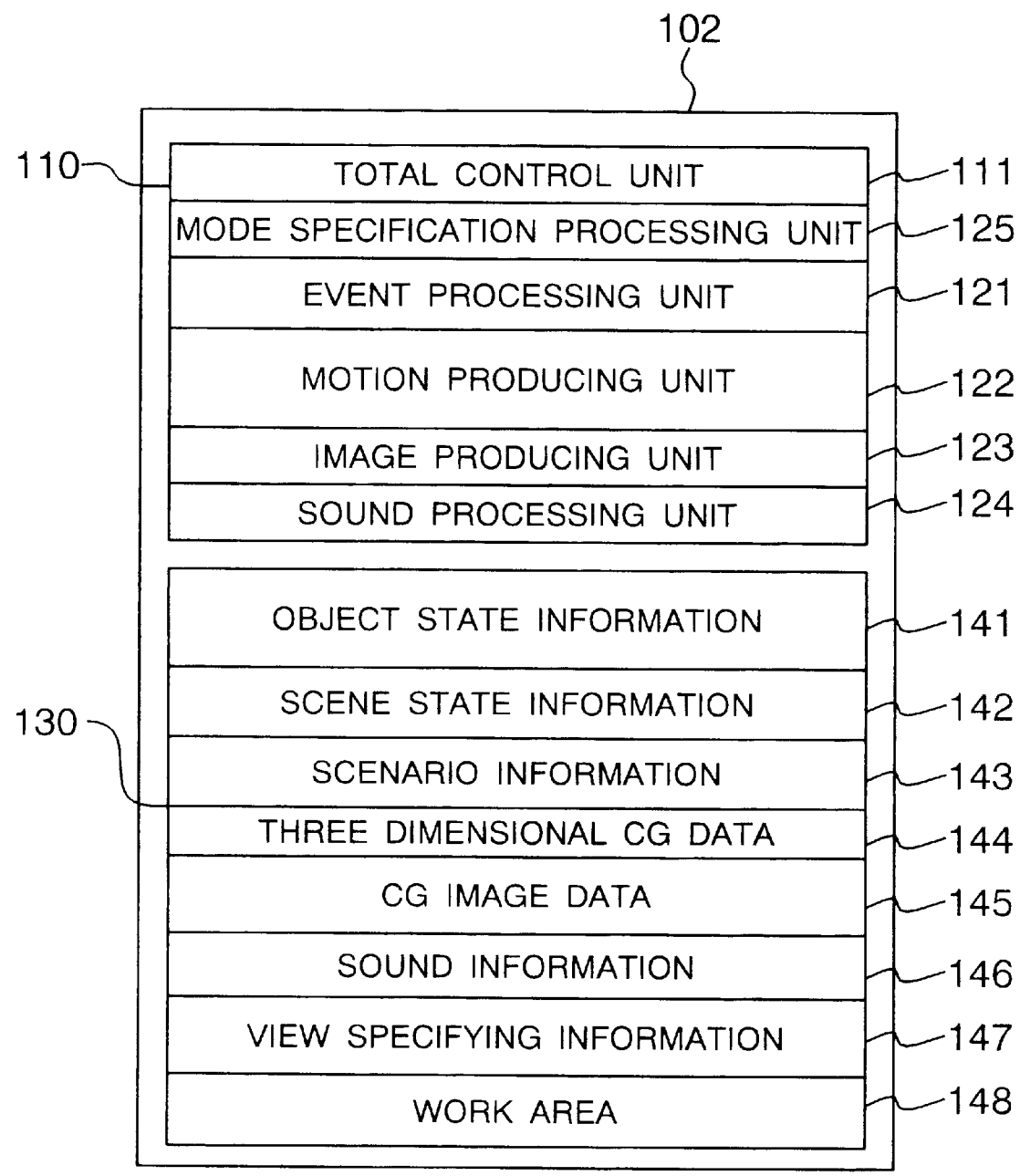
FIG. 2 is a schematic view useful in explaining a constructional example of the interior of a main storage device shown in FIG. 1.

FIG. 2 shows a structure of the main storage device 102. As shown in FIG. 2, the main storage device 102 includes a program area 110 and a data area 130. In those areas, the programs and the various data which have been transferred from the hard disc unit 100, and the data containing the image information to be put on the screen which has been transferred from the optical disc unit 300 are stored. Incidentally, all the programs and the data may not need to be temporarily present on the main storage device 102. The programs and the data may be transferred as required.

The program area 110 has an event processing unit 121 which serves to execute the processing of developing the story of the drama to determine the next state of the object and the scene as the programs for carrying out both the production of the image and the sound processing and which acts as the means for managing the progression of the drama, a motion producing unit 122 which serves to execute the processing of producing the three dimensional CG (color graphics) data which is used to show the motion and/or the state change of the object and the scene in the form of the three dimensional CG on the basis of the developed story, an image producing unit 123 which serves to execute the processing of producing the displayed CG image on the basis of the three dimensional CG data, a sound processing unit 124 which serves to execute the sound producing processing in accordance with the state of the object and the scene which has been determined in the event processing unit 121, a mode specification processing unit 125 which serves to execute the processing of specifying the various modes during the imaging, and a total control unit 111. Both the motion producing unit 122 and the image producing unit 123 act as the image producing means for producing an image for the display.

The mode specification processing unit 125 carries out the specification of the drama watching camera and the like for example. As for the specification of the drama watching camera, more specifically, there are specifying any one of the constituent elements constructing the virtual world, and specifying both a position and a direction of the virtual camera which is virtually specified when carrying out the imaging in the virtual world. Therefore, the mode specification processing unit 125 acts as the means for appointing an imaged space when carrying out the former and acts as the means for specifying a virtual camera when carrying out the latter. The virtual camera specifying means serves to specify the space to be imaged by specifying the position of the camera and hence acts as the means for appointing an imaged space. Incidentally, in addition thereto, the virtual camera specifying means may carry out the specification of the lighting, the specification of the zooming, and the like. In addition, when the specification is not carried out, or when only the rough specification is carried out, the specification of the particulars is carried out in accordance with the standards on the system side. Those specifications are received through the input unit 200.

Incidentally, by receiving the data relating to the selection of any one of a plurality of view specifying objects which are previously allowed (for example, a plurality of characters) through the input unit 200, the virtual camera specifying means can carry out the specification of both the position and the direction of the virtual camera in correspondence to the visual sense of the selected view specifying object. In the case where the virtual camera specifying means includes either the control box 230 or the remote control system 240, the specification of the virtual camera can be, for example, as described above, carried out by utilizing either the control box 230 or the remote control system 240.

In addition, the virtual camera specifying means has the standard specification data which is previously specified with respect to both the position and the direction of the virtual camera and hence can make the selection of the standard specification data possible through the input unit 200. In addition, the virtual camera specifying means has the standard specifying data which is previously specified with respect to both the position and the direction of the virtual camera, and hence can specify both the position and the direction of the virtual camera on the basis of the standard specification data in the case where the specification from the outside is not present.

The mode specification processing unit 125 stores the mode specifying contents as view specifying information 147 of the main storage device 102 which is shown in FIG. 2 and will be described later. The image producing unit 123 produces the image in accordance with the mode specifying contents stored in the view specifying information 147. In this connection, the items which are not specified follows the predetermined standard specification.

The total control unit 110 manages the processing of the whole system such as the I/O management, the file management and the task management. That is, the total control unit 110 functions as the operating system.

Both the data which has been required for the production of the image and the production of the sound, and the data for use in the work are stored in the data area 130. That is, there are stored in the data area 130 object information exhibiting the figure, the attribute and the present state of each object, scene information 142 exhibiting the background, the situation and the present state of each scene, three dimensional CG data 144 which is produced in the motion producing unit 122, CG image data 145 into which the three dimensional CG data 144 is converted in the image producing unit 123, view specifying information 147, and sound information 146 containing the speech, the effect sound and the music which are previously recorded.

By each of the object information 141 and the scene information 142 is meant the special feature describing information in which the special features of the constituent elements of the virtual world in which the drama is developed are described. The object information 141 is the information in which the description is carried out with respect to the characters and the objects which are mainly present in the virtual world. On the other hand, the scene information 142 is the information in which the states of scenes in a plurality of local spaces constructing the virtual world are described.

The object information 141 includes as the objects both the characters, and set and properties. Now, by the character is meant the character which is supposed to conduct himself/herself consciously and can conduct like a human being. In general, the character designates the person who is called the character, but may contain an animal, a plant, a doll and a robot which are personified, and other objects. However, the object, which designates the human being but is not supposed to conduct himself/herself consciously, such as a passer-by, a human being who is present in the background, or a large group of people, is not treated as the character in the present embodiment. Those objects belong to the set and properties, the background of the scene or the like. In addition as described above, the character may be an object of specifying a view. On the other hand, the set and properties are the objects which are not supposed to behave consciously. In general, the set and properties designate the objects which are present in the space. But, the objects, which are fixedly mounted in the space, such as the ground, the buildings and the background are not treated as the set and properties in the present embodiment. Those objects belong to the scene which will be described later.

By the figure of the object is meant the structure if the human body is, for example, of interest. For the figure, the human body is divided into a plurality of segments, which are connected to one another through the associated joints, such as the hips, the bust, the right hand upper leg, the left hand upper leg, the right hand upper arm, the left hand upper arm, and the head. Then, the figure is described by the names of the individual segments, the connection relationship therebetween, and the shapes of the segments. In addition, by the attribute of the object is meant the looks, the hair style, the distinction of sex, the age, the feeling, the capacity, the clothing and the like in the case of the human being. By the present state of the object is meant the presence position (the coordinates of the central point) in the space, the position and the posture in the space which are expressed by the amount of relative displacement(the coordinates and the joint angles) with respect to the central point of each segment, and the appearance which is exhibited by the present setting of the attribute.

Figure 6:
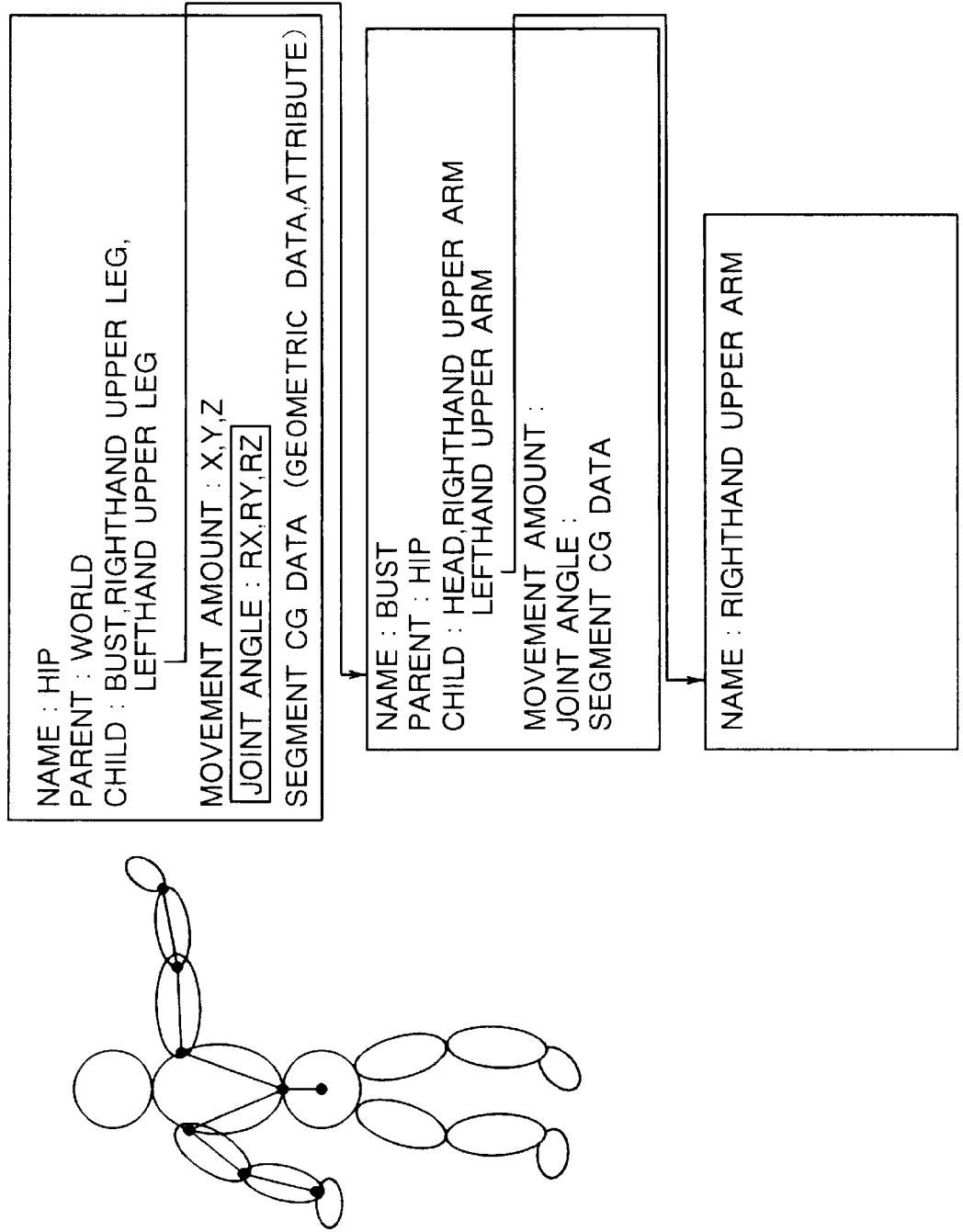
FIG. 6 is a view showing an example of a data structure of object data.

The object data is, for example, stored in the form of the data structure as shown in FIG. 6. For example, in the case where the object is the character, as apparent from FIG. 6, each segment of the human body is defined by being hierarchically linked through the associated joint. This is also applied to the set and properties.

The scene information 142 is the information in which for every local space, the structure, the background and the attribute are described every scene. By the local space is meant the space where the drama is made to occur. For example, the local space is the space of the roads, the buildings, the woods, the vehicles or the like. Each of those spaces has a fixed structure and the appearance. In addition, there is the background where the roads, the buildings, the woods, the vehicles and the like are present. In addition, with respect to those states, there are the change in time, the change in the weather condition, the artificial change, the change in the brightness, and the like. For this reason, the structure, the background and the attribute which are necessary to image the local spaces every scene are described in the form of the scene information. For example, FIG. 5 shows an example of the virtual world which is supposed in the embodiment of the present invention.

Figure 5:
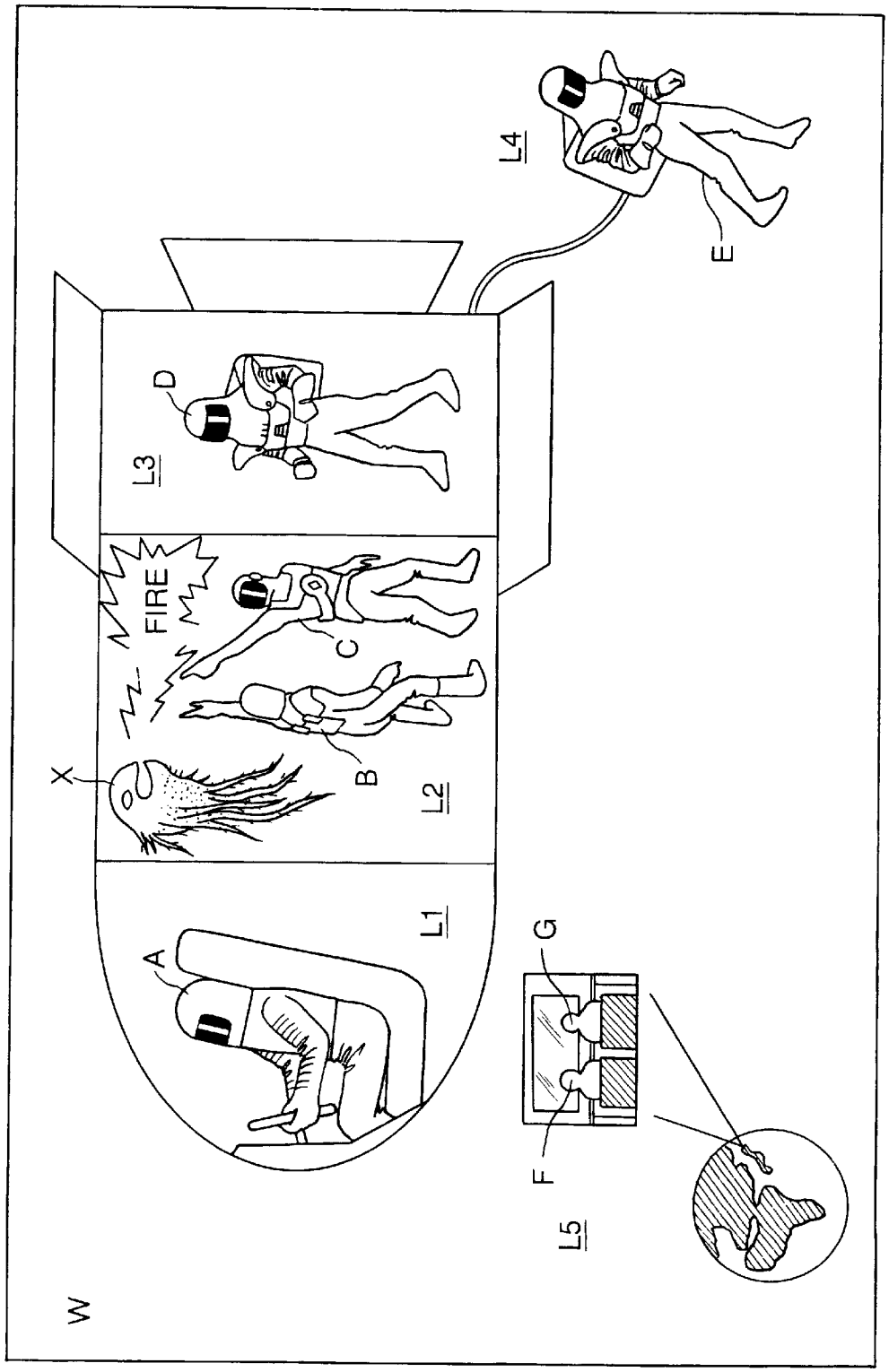
FIG. 5 is a view useful in explaining an example of the virtual world in an embodiment of the present invention.

In the example shown in FIG. 5, the virtual world contains a space craft having a plurality of internal blocks, and a ground command center as the stage of the drama. In this case, the local spaces are the spaces L1, L2 and L3 of the internal blocks of the space craft, a space L4 outside the space craft, and the ground command center L5. The whole space containing those local spaces is the virtual world W.

The scenario information 143 is the information for progressing the drama which is made occur in the virtual world, and hence contains event information in which the event, which is made occur in the drama, is described, performance describing information in which the performance of each character is described, property describing data in which the presence state of the set and properties is described, and local space state describing information in which scene specification of each local space is described. The event information contains the data in which the occurrence conditions, the occurrence contents of the event, and the extended effect following the occurrence of the event are described together with the time data belonging to the scenario. Now, the event designates, for example, the various behaviours and occurrences which the character experiences and which occur in the story, such as the action, the observation, the encounter, the separation, the life and death, the change in the environment, or the battle. Then, the event is previously described as the constituent element of the story. Incidentally, the time data belonging to the scenario is not limited to the description of the time itself. For example, the time data belonging to the scenario may contain the information as long as the order thereof can be specified on the time series. As an example thereof, the count value of a counter may be given. On the basis of this time data belonging to the scenario, the various dramas which are made occur in the whole virtual world are synchronized with each other.

The performance describing information contains the data in which the position, the action and the attribute of each character are described together with the time data belonging to the scenario. The property describing information contains the data in which the position, the motion and the attribute of the character are described together with the time data belonging to the scenario. In addition, the local space state describing information contains the data in which the structure, the background and the attribute of the local space in each scene are described together with the time data belonging to the scenario. In addition, both the information which is used to specify the local space where the view is placed, as the standard specification, and the information which is used to specify both the view position and direction in which the virtual camera is placed in each local space are described in the scenario information. Further, in the case where the zooming is required, the information therefor is also described in the scenario information.

FIGS. 7A and 7B show an example of the scenario information. The scenario information shown in the figure relates to the drama of the event which occurs in the space craft shown in FIG. 5. In FIGS. 7A and 7B, the three cabins L1, L2 and L3 in the space craft, the space L4 outside the space craft, and the ground command center L5 are supposed as the local spaces. All the local spaces construct the virtual world W. In FIGS. 7A and 7B, the scenes are arranged in turn with respect to those local spaces. The numerical characters arranged in the longitudinal direction represent the scene numbers. Those scene numbers are common to the local spaces and the time is also common thereto. While not shown in FIGS. 7A and 7B, the time data is described in the scenario in order to make up the time order between the local spaces. This time data is commonly specified in the virtual world W. This results from that the relationship of cause and effect of the event occurring in the local space is prevented from being disturbed. That is, in the case where the event which has occurred in a certain local space extends to another local space, and then a new event occurs in another local space, if the time in a certain local space is different from the time in another local space, the occurrence order of the event in another local space will be disturbed and hence the relationship of the cause and effect will be broken off. For the purpose of preventing such a situation, the time is made common therebetween. Therefore, with respect to the local spaces which do not interact each other even if direct or indirect, it is unnecessary to make the time common therebetween. For example, for the local space where the interaction to other local spaces is interrupted for a certain period of time as the space craft which has travelled to the remote space and hence can not carry out the communication, the progression of the time therein may be put forward or delayed with respect to the time in other local spaces.

In addition, in FIGS. 7A and 7B, in the righthand column to the scene number, the symbols W, L1 and L2 are given every scene. This represents the standard imaged specified space in the system. In this case, the symbol W specifies the imaging for the whole space. The specification of "L1 and L2 alternation" represents that in the scene of interest, the two local spaces L1 and L2 are alternately imaged. In addition, in that column, the instructions "approval of specification" and "disapproval of specification" are described. This represents that in the scene of interest, neither the images space specification nor the view specification is allowed. For example, even if either the local space L1 or L2, e.g., the local space L1 is specified in the scene 1 or the scene n, this specification is not allowed and the image of the whole virtual world W is displayed. On the other hand, in the scene 3, in the case of the standard, the image is displayed in which the local space L1 and the local space L2 are alternately contained. However, since "approval of specification" is set in the scene 3, if the local space L1 is specified, the specification of "L1, L2 alternation" is disregarded and hence the image of the local space L1 is displayed.

Further, in FIGS. 7A and 7B, the event, the camera, the speech and the sound are described every scene. In FIGS. 7A and 7B, the typical items are exemplified and hence the general items are not limited thereto.

In the item of the event, the occurrences which occur in the respective local spaces, the states of the characters therein, the states of the set and properties, and the like are described. For example, in the scene 1, there is described the state in which three spacemen A, B and C carry out the operation in a cockpit. In addition, the occurrence of a fire is described in the local space L2 in the scene 2. Further, the appearance of the extraterrestrial life is described in the local space L2 in the scene 3. In FIGS. 7A and 7B, for the sake of simplicity, only both the occurrence and the present state are simply described. However, actually, the coordinates exhibiting the position, the influence upon the object, the influence upon the background, and the like are described in detail. Of course, that description is carried out by utilizing the language which can be decoded by the information processing unit. Therefore, if the information processing unit can decode the natural language, the description may be performed by utilizing the natural language. In this case, for the sake of convenience of the description, the description is performed with the natural language. In addition, the position, the movement, the deformation and the like of the object are given by the coordinates, and the movement speed, the movement locus and the like of the object are given by the numerical values.

With respect to the camera, in the virtual world W and the local spaces L1 to L5, the position of the camera performing the photographing (the view), the object of the watching carefully (the camera direction) and the zoom are described. In the figure, for the sake of convenience, that description is carried out by utilizing the world. However, actually, that description is carried out by utilizing the numerical values such as the coordinates representing the camera position, the azimuth representing the direction, and the zoom ratio. In addition, for the movement of the camera as well, the equation for defining the movement locus, the coordinates of the start point and the end point which are given to the equation, and the values of the movement speed are described. In addition, in FIGS. 7A and 7B, while not illustrated in the figure, the values of the lighting are also described.

With respect to the speech, the characters which are present in the respective local spaces are specified, and the speeches are assigned to the characters, respectively. Incidentally, with respect to the speech, the same speech is assigned to other local spaces as long as those local areas are located in the area where the characters can hear that speech. But, since the speaker is not present in other local spaces, the speaker does not appear in the image. In addition, in the case where the sound volume is small since the character of interest is apart from the speaker, that effect is specified. In FIGS. 7A and 7B, while the simple speech is described for the sake of convenience, actually, the more amount of speech having the more complexed turn of phase is described. In addition, in FIGS. 7A and 7B, while the speech is described in the form of the natural language, since the speech is previously recorded in the present example, actually, the identifiers for specifying the respective speeches, i.e., the speech codes are described. Incidentally, in the case where the voice is produced by the speech synthesizer, the procedure may be adopted such that the speech is firstly described in the form of the character code, and then on the basis thereof, the voices are synthesized by the synthesizer. In this case, the volume, the pitch and the like of the sound are also specified. In addition, with respect to the individual characters, the respective voice qualities are defined as the attribute.

As for the sound, there are specified the background sound, the effect sound, the music and the like which occur in the respective local spaces. As for the background sound, for example, the indoor noise, the noise of the machinery, and the like are given as examples. As for the effect sound, for example, the alarm sound, the message sound, the fire burning sound, and the like are given as examples. In addition, as for the music, for example, the theme music, the ending music, the insertion music and the like are given as examples. Those sounds and musics are previously recorded and then are used. Incidentally, with respect to the sound and music which can be synthesized, the synthesization may be carried out therefor. With respect to those sound source as well, the identifiers (the sound codes) for specifying the respective ones are added thereto.

Next, as the three dimensional CG data 144, the three dimensional CG data is stored in which the scenes and the objects which have been produced in the motion producing unit 122 are described. This data described the state of the scene and also describes, in the form of the coordinates in the three dimensional space, the position, the movement and the behavior of the character appearing in that scene, the event and the like occurring in that scene as well as the position, the change and the like of the set and properties appearing in that scene. In addition, that data contains all the items, which are described in the scenario, such as the specification of the display colors, the specification of the attributes, and the sounds. The CG image data 145 stores the image data which has been produced from the three dimensional CG data in the image producing unit 123.

As the view specifying information 147, the view specifying information is stored which has been inputted through the input unit 200, i.e., as described above, the specification of the position, the direction and the like of the camera is stored. In addition, in the view specifying information 147, there is described the information representing whether the specification is the standard specification or the user specification, and in the case of the user specification, whether only the space is specified or both the position and the direction of the view are also specified. This information is displayed by the flag for example. By referring to this flag, it is possible to judge whether or not the view specifying information needs to be fetched in.

As the sound information 146, as described above, the data is stored in which the speech, the effect sound, the background sound, the music and the like are recorded. This data consists of the sound sources and the identifiers for specifying the sound sources. Incidentally, the procedure may be adopted such that the sound source is stored in another unit, e.g., the optical disc unit and the storage address thereof is stored in that area, and under this condition, the speech and the like are sent from either the optical disc unit 300 or the hard disc unit 400 to the sound reproducing unit 500.

The work area 148 is used for the work of the main processor 101, and the various data and the like are temporarily stored therein.

Figure 3:
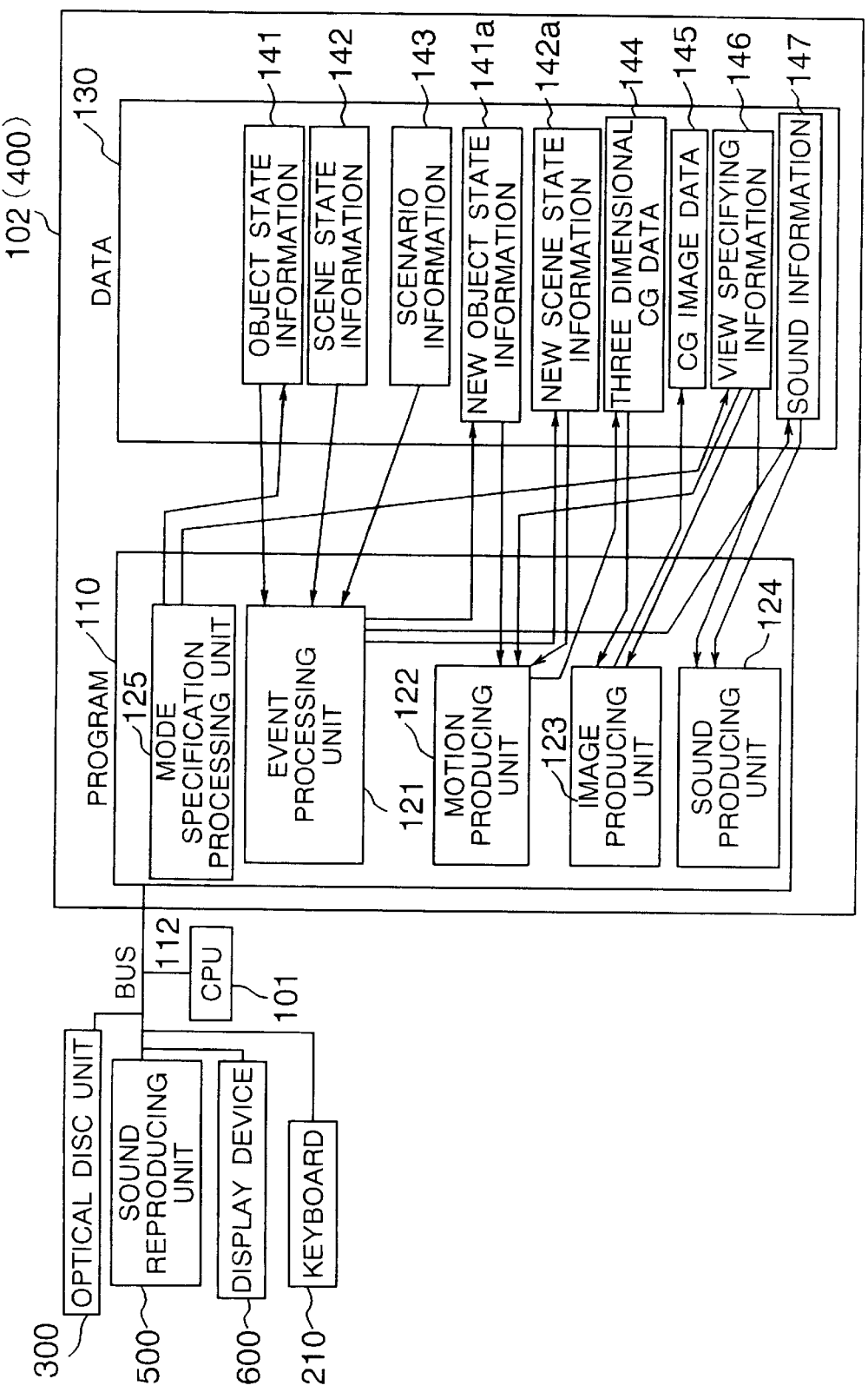
FIG. 3 is a schematic view useful in explaining the outline of the mutual relationship between a program and data stored in the main storage device shown in FIG. 2.

FIG. 3 shows the outline of the mutual relationship between the above-mentioned programs and the data. In FIG. 3, there is shown the state in which both the programs and the data are stored in the main storage device 102. In the state in which the system is not activated, both the programs and the data are stored in the hard disc 400.

Incidentally, since the relationship between the programs and the data has already been described, in FIG. 3, the description will be only given with respect to both new object state information 141a and new scene state information 142a here. In FIG. 3, the new object state information 141a is a part of object state information 141, and new scene state information 142a is a part of scene state information 142. The information which is described in the new object state information 141a and the new scene state information 142, respectively, is obtained by rewriting the contents described in the object state information 141 and the scene state information 142 in accordance with the specification of the scenario, and exhibits both the initial states and the changes, in the scene of interest, of the object state information 141 and the scene state information 142. The contents of both the new object state information 141a and the new scene state information 142a are updated every scene.

Next, the operation of the present invention will hereinafter be described in detail with reference to flow charts in addition to the above-mentioned drawings.

Figure 8:
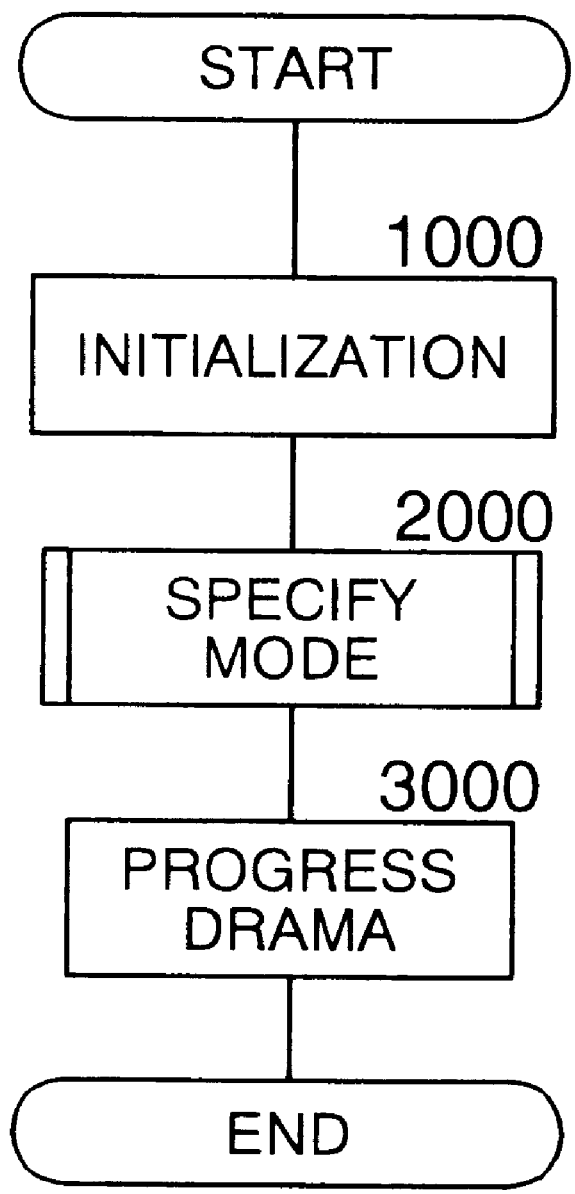
FIG. 8 is a flow chart showing the outline of the operation of a system according to an embodiment of the present invention.

Firstly, as shown in FIG. 8, at the time when the present system is activated, the processing such as the initialization (Step 1000) is executed for the whole system. Then, after the processing of specifying a mode has been executed (Step 2000), the drama is progressed (Step 3000).

Figure 9:
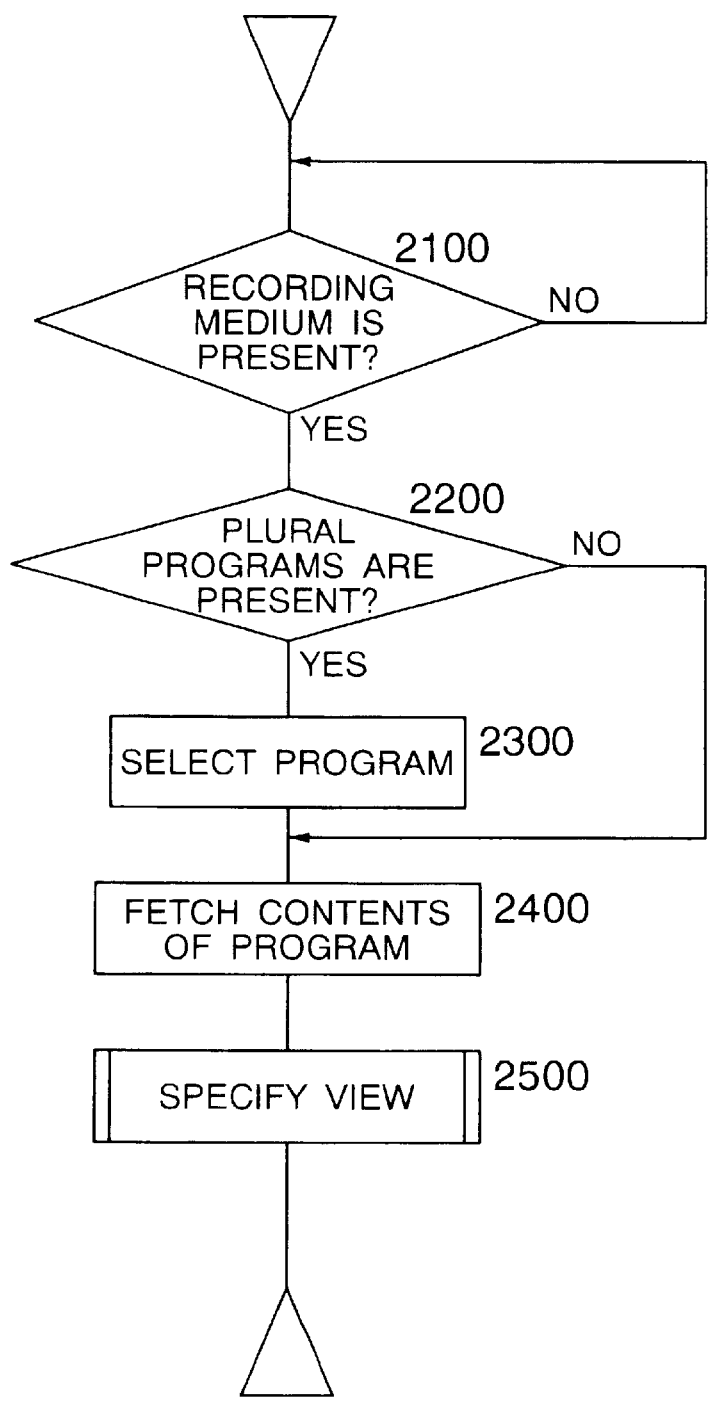
FIG. 9 is a flow chart showing the outline of the processing of specifying a mode shown in FIG. 8.

The mode specification is executed in the manner as shown in FIG. 9 for example by the mode specification setting unit 125. The CPU 104 checks whether or not the optical disc is mounted in the optical disc unit 300. If not, the CPU 101 waits the mounting of the optical disc (Step 2100). At this time, the message that the optical disc must be mounted in the optical disc unit 300 may be displayed on the screen of the display device 600. In addition, the message having the same purport may be announced through the sound reproducing unit 500. In the case where the optical disc is mounted in the optical disc unit 300, the CPU 101 checks whether or not a plurality of programs are recorded in the optical disc (Step 2200). If so, the names of a plurality of programs are displayed on the display device 600 to wait the selection by the user (Step 2300). At the time when the user selects the desired program through the input unit 200, or in the case where the program is independently recorded in the optical disc, the data relating to the program of interest is fetched in the main storage device 102 (Step 2400). Incidentally, in the case where there is the many amount of data, the data relating to the initial part of the program is stored in the main storage device 102, and the data relating to the remaining part of the program is stored in the hard disc unit 400. In addition, the procedure may also be adopted such that the data relating to the remaining part of the program is normally not read out from the optical disc unit 300, but is read out therefrom only at the time when required. Thereafter, the view specification is executed (Step 2500). That is, the information processing unit 100 acts as the imaged space appointing means and/or the virtual camera specifying means, and hence carries out the appointment of the local space to be imaged, and the specification of the position, the direction and the like of the virtual camera as required.

Figure 10:
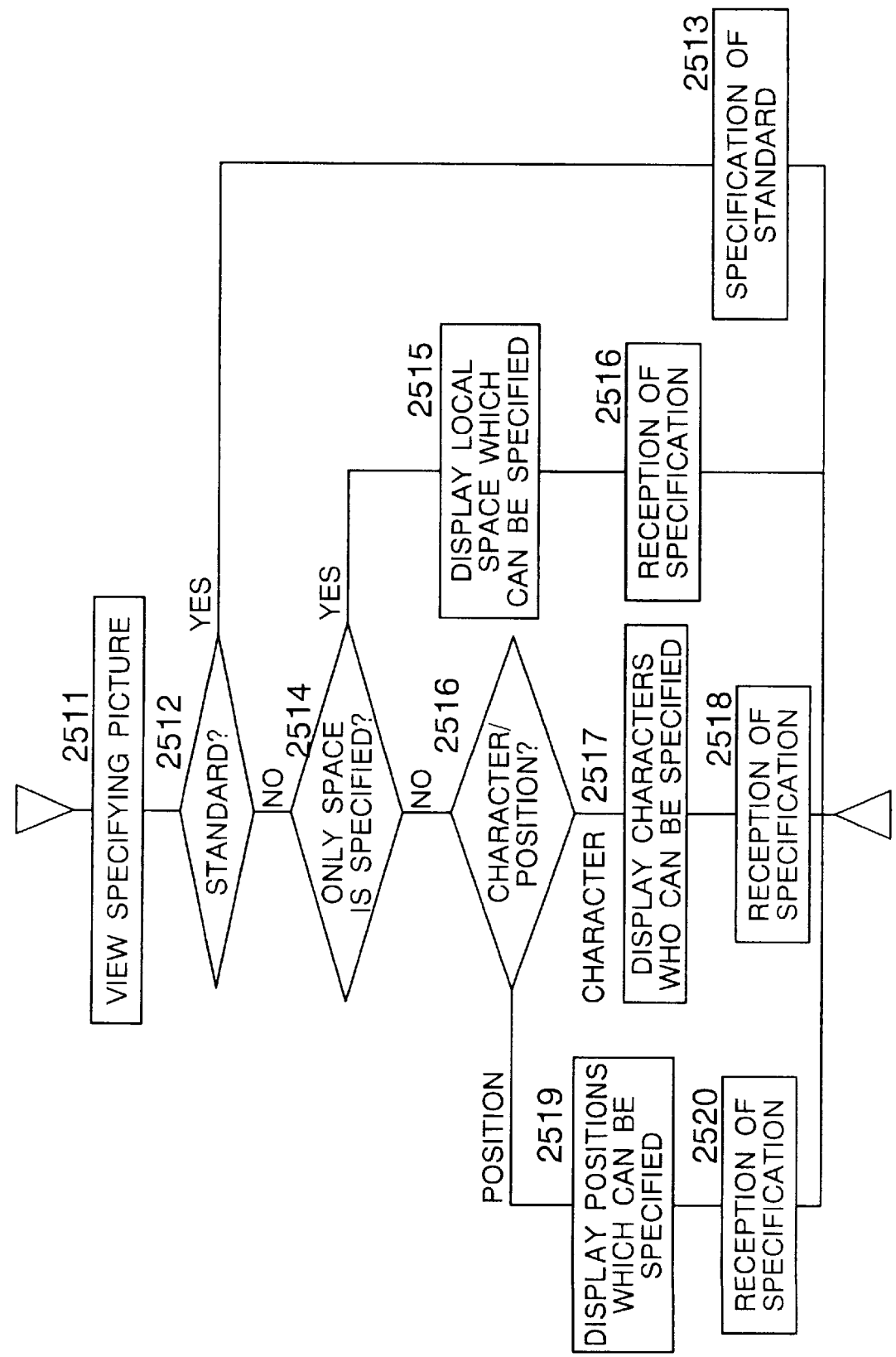
FIG. 10 is a flow chart showing the outline of the processing of specifying a viewpoint shown in FIG. 9.

The specification of the view is carried out in the manner as shown in FIG. 10. That is, firstly, the CPU 101 instructs the display device 600 to display the view specifying picture (Step 2511). In this case, the specification is conducted interactively. That is, the CPU 101 asks the user whether or not the standard is preferred for the specification of the view, and then waits the instruction for the selection issued from the input unit 200 (Step 2512). In the case where the selection that the standard may be available is inputted through the input unit 200, the imaging at the view which is previously specified in the system in the standard manner is employed. In this case, the CPU 101 sets the flag, representing that the view specifying information is not referred, in the view specifying information 146.

In the case where the selection that instead of the standard of the system, the user carries out the specification is provided, next, the CPU 101 asks the user whether only the local space is selected or further, the detailed specification is carried out (Step 2514). In the case where only the local space is specified, the local space which can be specified is displayed on the display device 600 (Step 2515). The reason for adopting such a procedure is that since there may be the local space which is merely placed auxiliaryly in the progression of the drama depending on the contents of the drama, such a local space is prevented from being selected. Then, the CPU 101 receives the specification by the user, with respect to any one of the local spaces, which is carried out through the input unit 200 (Step 2516).

Incidentally, during this specification, the specification is not limited to specifying simply the local space, but the local space may be specified in which a certain specific object, e.g., the specific character appears. In this case, the character is selected as in Steps 2517 and 2518 which will be described later. But, in the specification in Step 2516, the visual sense of the specific character is not specified to the position of the virtual camera at all. The specification in Step 2516 is different in this point from the specification in Step 2518 which will be described later. In addition, the adjacent two or more local spaces may also be specified. In this case, all the local spaces thus specified will be displayed on one screen. For example, if all the local spaces are specified, the picture as shown in FIG. 5 will be obtained.

In addition, in the case where the user carries out the selection of specifying the position of the view in Step 2514, next, the CPU 101 asks the user to select whether the specification of the view is carried out on the basis of the character(s) or by specifying the position of the space, on the basis of the displayed contents on the display device 600 (Step 2516). Now, in the case where the specification of the view based on the character(s) is selected, the CPU 101 instructs the display device 600 to display the character(s) which can be specified on the display device 600 (Step 2517). The display is carried out in such a way that for example, the names and the portraits of the characters (the animals, the plants and other objects may be available in some cases), and the brief description of the parts thereof if necessary are shown in order to be able to readily select those items. The reason for limiting the characters in a sense is that the character(s)(the leading actor(s)/actress(es)) which appears frequently over the whole drama is limited. At the time when the character which is treated as the view is specified by the user through the input unit 200, that specification is received, the corresponding flag is set and also the data relating thereto is stored in the view specifying information 147 (Step 2518).

On the other hand, in the case where the specification of the view based on the position is selected, the CPU 101 instructs the display device to display the position which can be specified, and then asks the user the selection thereof (Step 2519). At the time when the data relating to the specification of the position has been sent from the user, the CPU 101 receives the data relating to that specification, sets the corresponding flag and also stores that data in the view specifying information 147 (Step 2520).

Figure 15:
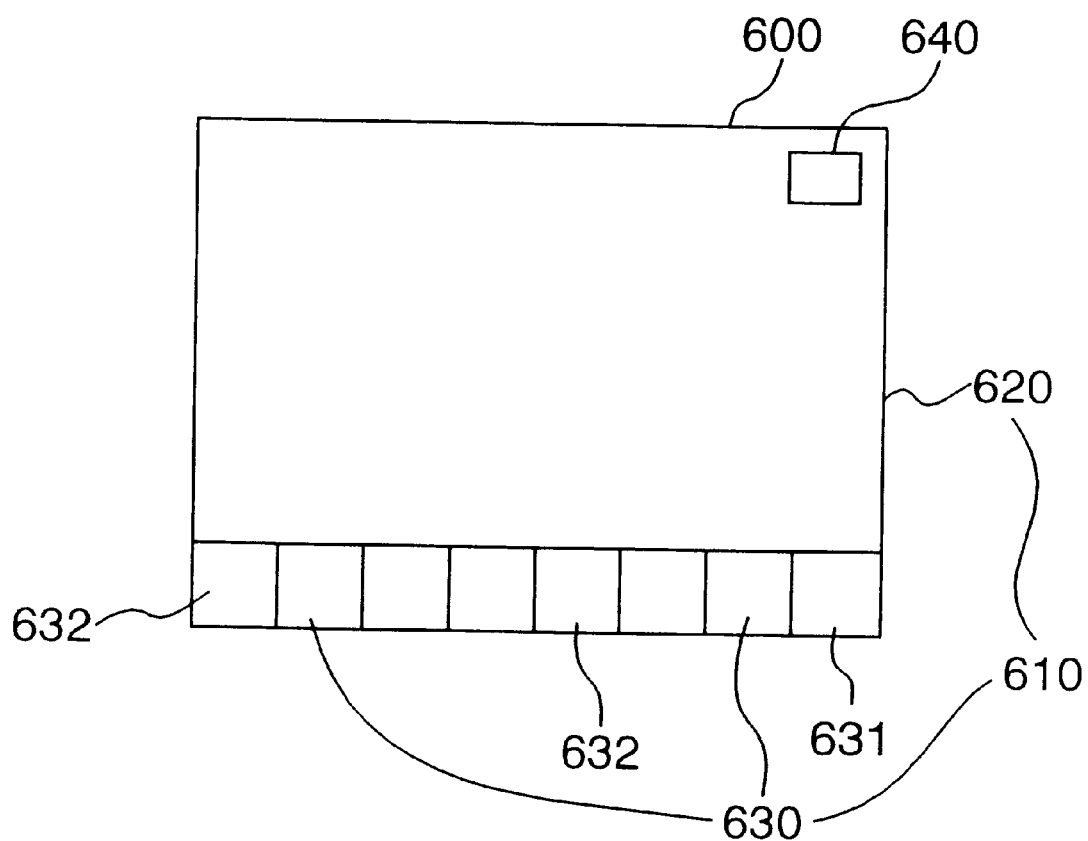
FIG. 15 is an explanatory view showing an example of the picture display for carrying out the selection in the picture in an embodiment of the present invention.

The selection of the view specification and the like of the virtual camera as described above is, for example, carries out on a display screen 610 of the display device 600 as shown in FIG. 15. That is, as shown in FIG. 15, the display screen 610 of the display device 600 is divided into a main screen 620 and a subscreen 630, and a plurality of areas 631, 632 and 633 as the software keys are set in the subscreen 630 and also the keys are set to the respective areas 631, 632 and 633. In such a way, that selection can be realized. In addition, there is also provided a soft key 640 for the standard setting. This soft key can be displayed and erased as required.

In addition, the operation for the view specification and the like of the virtual camera can be carried out by using the control box 230 or the remote control system 240 for example. In the case of the control box 230, more specifically, the longitudinal movement of the virtual camera can be instructed by inclining the joy stick 232 back and forth, and also the crosswise movement of the virtual camera can be instructed by inclining the joy stick 232 from side to side. In addition, the control of the vertical rotation of the virtual camera (the rotation in the direction of the elevation angle) can be instructed by inclining the joy stick 232 back and forth while pressing down the push button A. Further, the control of the inclination of the virtual camera (the rotation around the horizontal surface) can be instructed by inclining the joy stick 232 from side to side while pressing down the push button A. Further, the control of the zoom of the virtual camera can be instructed by inclining the joy stick 232 back and forth while pressing down the push button B. The return to the standard camera position can be instructed by pressing down the push button C. The above-mentioned operation is given as an example and hence the actual operation is not limited thereto.

Now, the description will hereinbelow be given with respect to a concrete example relating to the selection of the view specification and the like of the virtual camera with reference to FIGS. 20 to 22 and FIGS. 23A to 23C. In this example, it is assumed that the remote control system is used.

Figure 20:
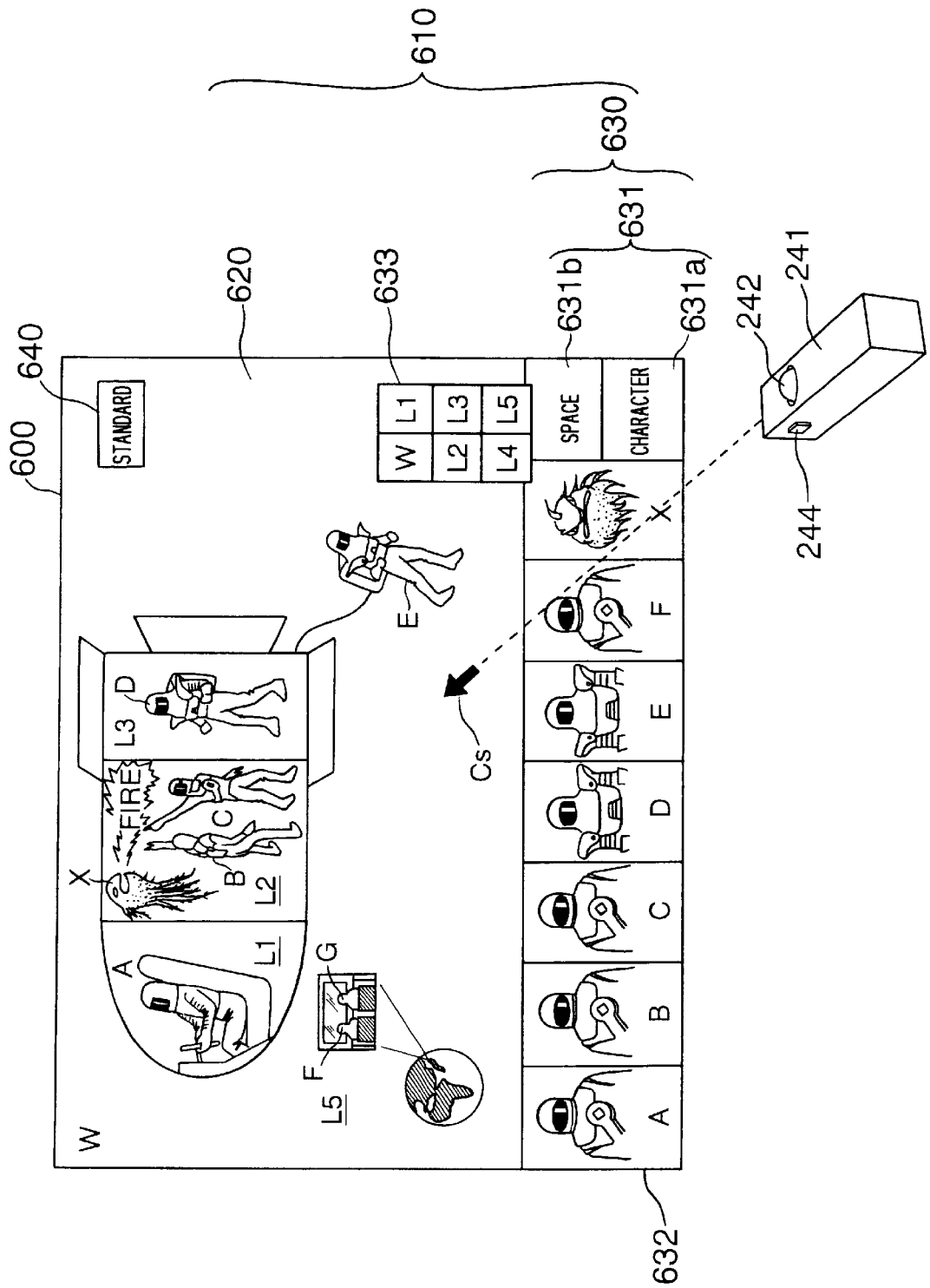
FIG. 20 is an explanatory view showing an example of the menu selection picture which is used in an embodiment of the present invention.

Firstly, the menu screen for the selection as shown in FIG. 20 is displayed on the display screen 610 of the display device 600. This menu screen is previously prepared in each program. In this case, the program shown in FIG. 5 is taken as an example. On the menu screen shown in FIG. 20, in the same manner as that shown in FIG. 15, both the main screen 620 and the subscreen 630 are displayed. In addition thereto, the icon 640 for instructing the standard setting is displayed in the main screen 620. In the same manner as that shown in FIG. 5, the virtual world W showing the whole program which will be put on the screen in future is displayed on the main screen 620. In addition, an imaged space menu key 631 for specifying the space to be imaged is displayed on the subscreen 630. This imaged space menu key 631 consists of a character specifying key 631a and a space specifying key 631b which are used to select whether the specification is carried out on the basis of the character or space. Further, in the case where the character specifying key 631a is selected, the character keys 632 for selecting the associated characters are provided in correspondence to the number of selectable characters. In the example shown in FIG. 20, for the character keys 632, both the images and the character names (represented by A, B, C, . . . , X) showing the respective characters are displayed in the frames in which the respective keys are defined. In addition, in the case where the space specifying key 631b is selected, the space keys 633 for selecting the associated spaces are provided in correspondence to the number of selective spaces. In the example, shown in FIG. 20, the space keys 633 are prepared so as to be able to select the local spaces L1 to L5 and the virtual world W.

Figure 23A:
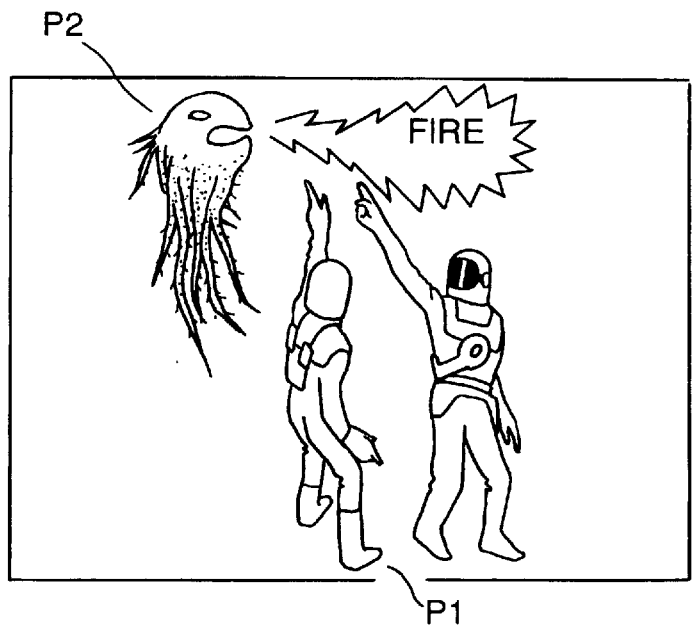
FIGS. 23A, 23B and 23C are respectively an explanatory view showing a state of specifying both the position and the direction of the virtual camera in the local space, an explanatory view showing an example of the displayed picture in the case where the camera position is specified to a point of P1 in FIG. 23A, and an explanatory view showing an example of the displayed picture in the case where the camera position is specified to a point of P2 in FIG. 23A.

In such a way, at the time when the imaged space has been specified, the image with respect to the specified space is displayed. A point of difference between the character specification and the space specification is that with respect to the former, the local space where specified character appears is displayed, and with respect to the latter, only the specified space is displayed. That is, with respect to the former, if the specified character is moved to the different local space, the displayed space is changed with the movement of the specified character, but with respect to the latter, the displayed space is not changed at all. In addition, in the case where the specification of the view, i.e., the virtual camera is not carried out, i.e., in the case of the standard, the display mode of the displayed space is not different between the case where the character specification is carried out and the case where the space specification is carried out. That is, for example, either in the case where the character B is specified or in the case where the local space L2 is specified, the image having the display mode shown in FIG. 23A is displayed.

Incidentally, the selection of those soft keys is carried out in such a way that on the basis of the operating unit 241 of the remote control system, the cursor Cs which has been displayed on the screen is moved onto the objective soft key by rotating the track ball 242, and at this position, the push button 244 is pressed down to be clicked.

Next, the description will hereinbelow be given with respect to a concrete example in the case where the specification of the position of the virtual camera and the subsequent specification thereof are carried out.

In this case, firstly, the description will be given with respect to the case where the character is specified, and next with respect the case where the space is specified.

Figure 21:
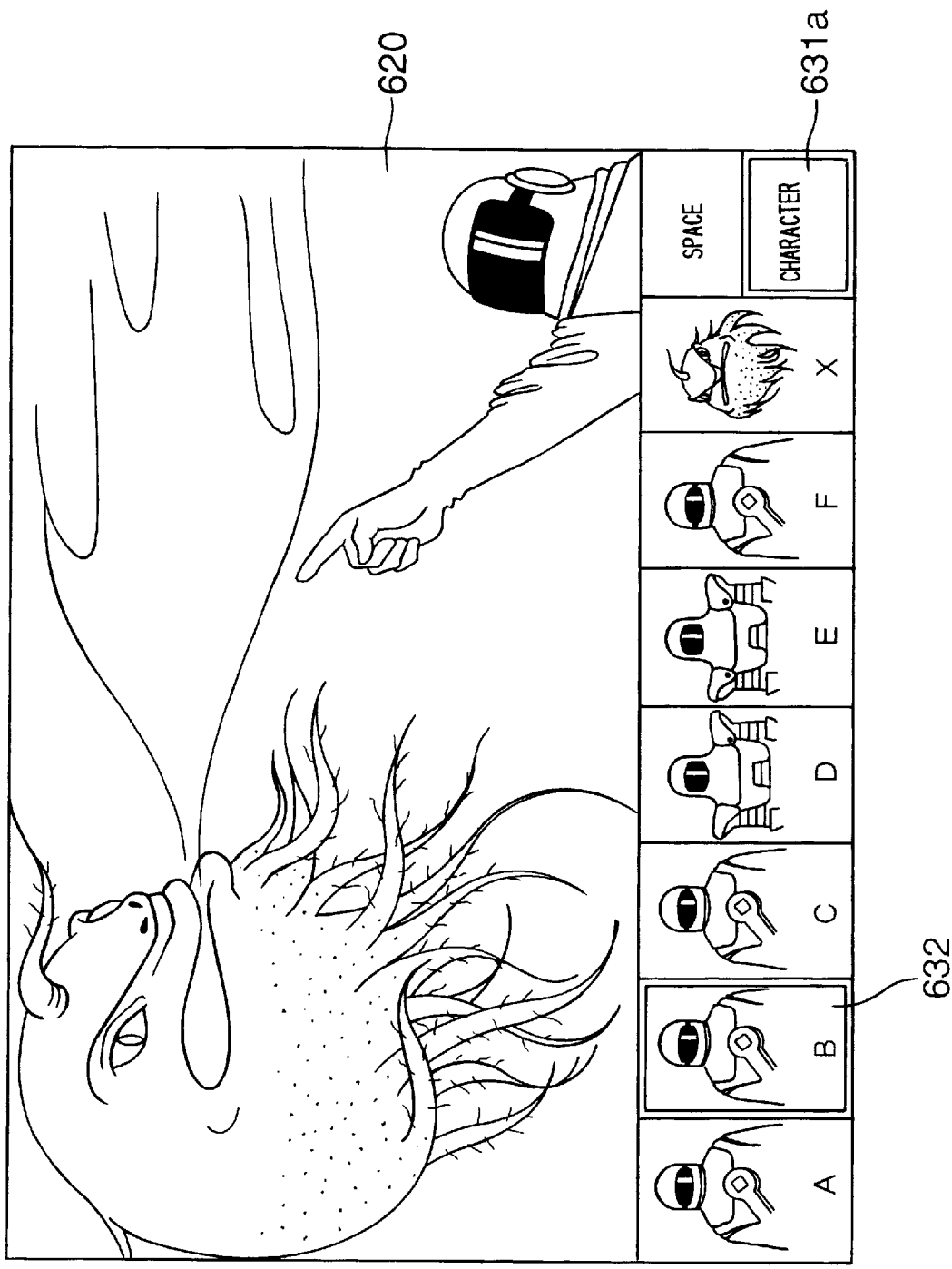
FIG. 21 is an explanatory view showing an example of the displayed picture in the case where both the position and the direction of the virtual camera are specified from a point of view of a character in an embodiment of the present invention.

As shown in FIG. 21, at the time when the character specifying key 631a has been selected, the enhancement display is carried out so as to show that the character specifying key 631a has been selected. That is, in the example shown in FIG. 21, the character specifying key 631a by which "the character" is displayed is displayed as if it is pressed down. In addition, at the time when the character key 632 representing the character B is specified, the character key 632 is displayed as if it is pressed down. In this state, the display shown in FIG. 23A is carried out on the main screen 620 shown in FIG. 21. Incidentally, this enhancement display is also applied to the specification of the space.

Further, at the time when the position of the eyes of the character is clicked in the character key 632, the position of the virtual camera becomes the position of the view of the character, and also the direction of the virtual camera becomes the direction of the character's eyes. That is, the virtual camera is specified as if the screen is viewed by the eyes of the character B. In the main screen 620 shown in FIG. 21, this state, i.e., both an alien X and the face of the character C which are viewed from the eyes of the character B are displayed. Thereafter, the image is displayed by the virtual camera and thus the story is developed. Of course, if as the story is developed, the character B is moved, the virtual camera is also moved with the movement of the character B, and the situation which the character B views is imaged. Therefore, in this view, the character B himself/herself is not displayed on the screen except the case where a part of the body, e.g., the hands and the feet appear in the view of the character B.

Figure 22:
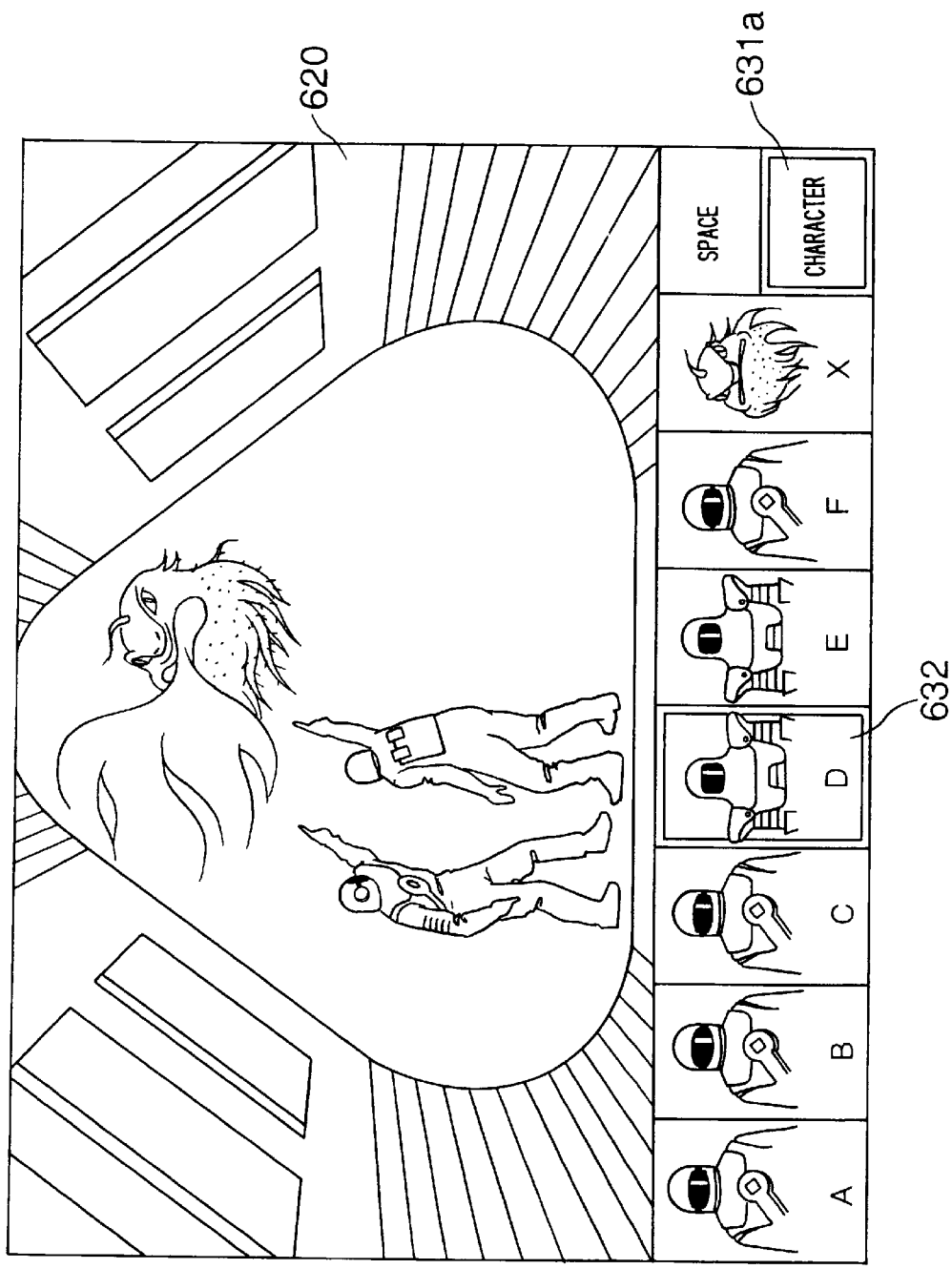
FIG. 22 is an explanatory view showing another example of the displayed picture in the case where both the position and the direction of the virtual camera are specified from a point of view of a character in an embodiment of the present invention.

An example shown in FIG. 22 shows an image in which the character D is specified and also the imaging from the view of the character D is carried out. This example shows the state in which the local space L2 is viewed from the local space L3 side. In this example as well, the character D himself/herself is not displayed on the screen.

Figure 23B:
Figure 23C:
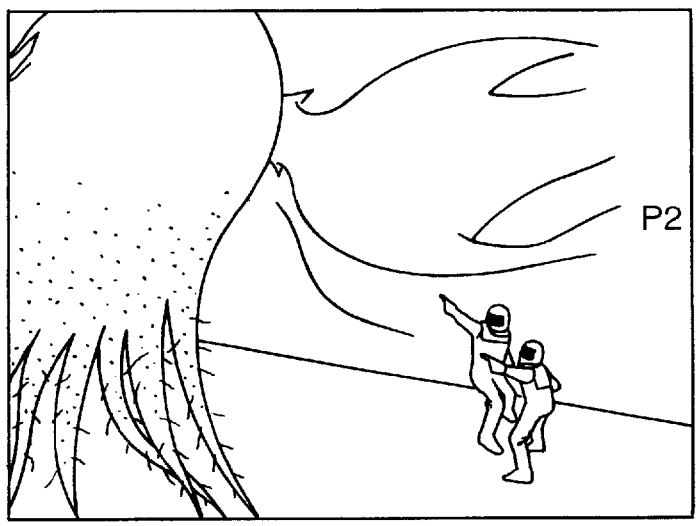

Next, the description will hereinbelow be given with respect to an example in which both the position and the direction of the virtual camera are specified in the space with reference to FIGS. 23A to 23C. In FIG. 23A, the local space L2 is displayed by the virtual camera of the standard specification.

In order to specify the view, i.e., the position of the virtual camera in this state, the cursor is placed in the objective position, e.g., the position P1 or P2 on the frame in FIG. 23A by rotating the track ball 242 of the operating unit 241. Then, by pressing down the predetermined push button out of the push buttons 243A to 243D, the definition of the operation of the track ball 242 is changed to the specification of the direction. Under this conditions, the track ball 242 is operated to rotate the direction of the cursor. As a result, it is possible to carry out the specification of the direction. FIG. 23B shows an example of the display screen in the case where the position of the virtual camera is specified to the point P1 and the direction of the cursor is set to the direction of the virtual camera. In this example, the display screen is specified in such a way that the upper side is viewed obliquely from the lower side of the character B. FIG. 23C shows an example of the display screen in the case where the position of the virtual camera is specified to the point P2 and the direction of the cursor is set to the direction of the virtual camera. In this example, the display screen is specified in such a way that the lower side is looked down obliquely from the rear upper side of the alien X.

Incidentally, the specification of both the position and the direction of the virtual camera may be carried out in the middle of the program as well in the opening of the program. In addition, the display mode which has been specified once may be returned to the standard in middle of the program. Further, the different specification may also be carried out. In addition thereto, every for a plurality of portions of the program, both the position and the direction of the virtual camera may be specified and then the resultant specification condition may be stored in the view specifying information 147. In such a way, by reproducing the whole program, the program can be expressed from the independent viewpoint, and hence the user can enjoy the program and also steep himself/herself in the happy atmosphere as if the user becomes the director.

In the above-mentioned example, in the case where the character is selected, any one of the characters may be selected. However, considering the relation to the story of the drama, it will be kinder to the user that the solution is limited to only the significant character(s). In this case, one or more selectable characters (the leading acter(s)/actress (es)) are previously specified on the system side, and those characters are displayed on the display device 600. Then, the user may select the specific character(s) out of the predetermined characters.

Incidentally, there may be the scene(s) in which the selected character does not appear in some cases. In such cases, the local space which is required for understanding the story development is previously specified on the system side with that selected character as the central figure. Then, the local space of interest is displayed.

Figure 11:
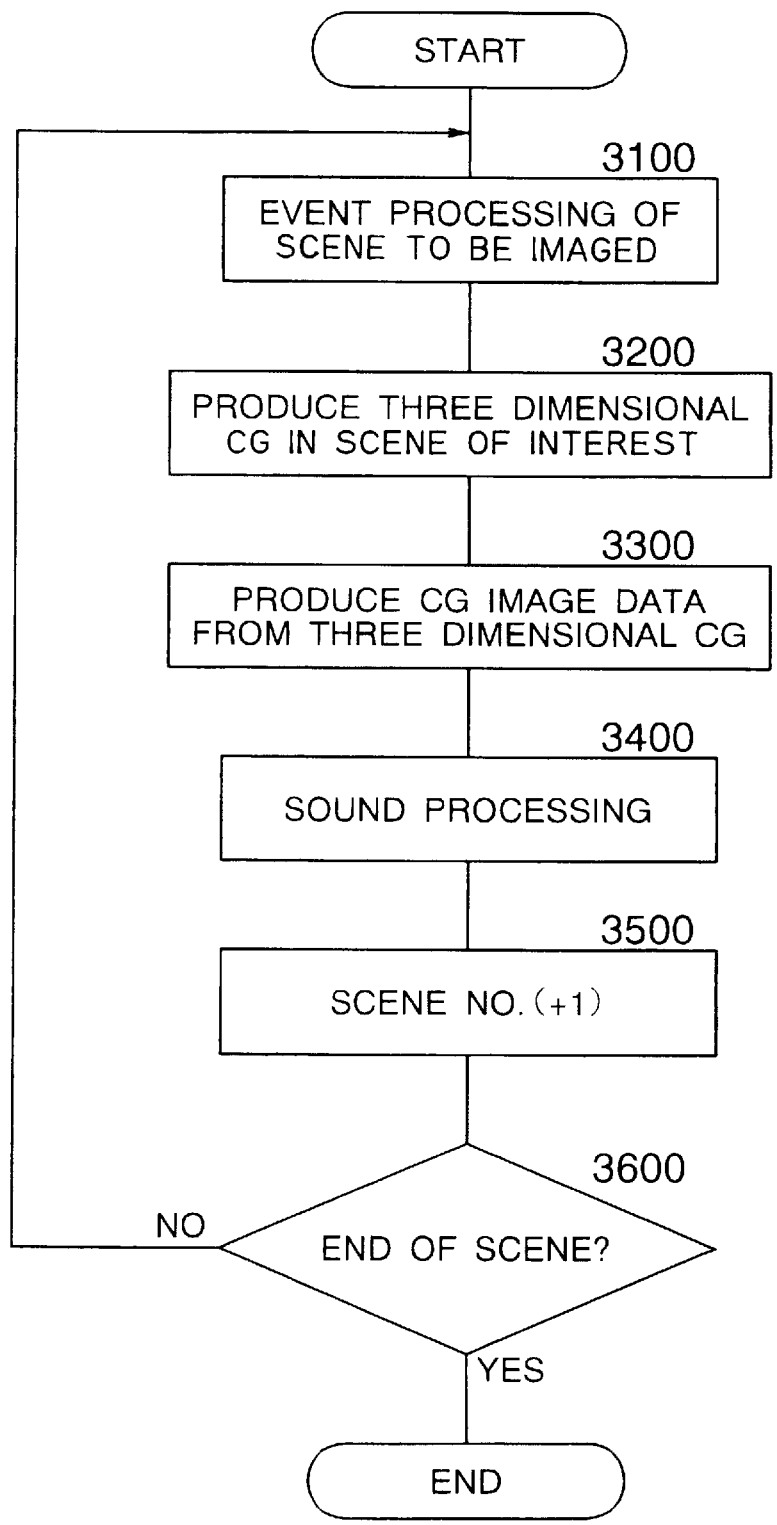
FIG. 11 is a flow chart showing the outline of the processing of progressing a drama shown in FIG. 8.

Next, the processings for the development of the drama, the production of the image, and the production of the sound are executed by the event processing unit 121, the motion producing unit 122, the image producing unit 123 and the sound producing unit 124. FIG. 11 shows the outline of the flow of those processings.

Firstly, both the object state information and the scene state information are read out by the event processing unit 121. In addition, the data relating to the scene to be imaged is extracted from the scenario information. Then, on the basis of the event(s) described in the scenario information, the processing of describing the object state of the object state information and the scene state of the scene state information is executed (Step 3100). This processing is executed with respect to all the virtual spaces. For example, in the case of the scenario information shown in FIGS. 7A and 7B, the scenario information for all the local spaces is read out. Then, both the description indicating the state of the object and the description indicating the state of the scene are individually fetched in from the items which are described as the events out of the scenario information thus read out. In addition, with respect to the individual objects, the change in the state of the scene of interest is described. Further, with respect to the scene as well, likewise, the change in the state of the scene of interest is described. More specifically, in the case of the character, on the basis of the object state information as shown in FIG. 6, the data relating to the segment CG such as the movement amount, the joint angles, the face, and the clothes is described in accordance with the changes as the initial state, the intermediate state and the final state in the scene of interest. The state information relating to those objects is stored in the new object state information 141*a*. Likewise, the state information relating to the scene is stored in the new scene state information 141*b*.

Next, on the basis of the new object state information and the new scene state information which are respectively stored in the new object state information 141*a* and the new scene state information 141*b*, the position, the motion and the like of the object are subjected to the interpolation processing, and then the processing of expressing continuously the scene in the form of the three dimensional CG is executed (Step 3200). In this case, the state in that scene is determined by referring to the view specifying information, and on the basis thereof, the structure, the background and the like of the space in the scene are described to produce a new scene state information which is expressed by the three dimensional CG. In addition, the relative coordinates of the appearing objects are determined. Then, the resultant three dimensional CG data is stored in the three dimensional CG data 145.

Next, the CG image data is produced from the three dimensional CG data (Step 3300). In this connection, only the part which is required for the display is executed on the basis of both the view specifying information and the scenario information. In addition, in this case, the three dimensional CG data is converted into the CG image data in accordance with both the position and the direction of the virtual camera. For example, in FIGS. 7A and 7B, the whole virtual world is specified in the scene 1, and also it is specified in the scenario that the virtual camera displays the complete view. In such a case, the CG image as shown in FIG. 5 is produced. In addition, in the case where any one of the local spaces is specified, the CG image is produced only for that space. For example, in the case where the local space L1 is specified, the state in the cockpit of the local space L1 is imaged together with the character A present in the local space L1. In this connection, further, in the case where the view position is spatially specified, the state viewed from that view position is imaged. In addition, in the case where the view is specified for the character B, as shown in FIG. 23A, for the state in the local space L2 where the character B is present, the characters B and C, and the extraterrestrial life X all of which are present in the local space L2 are imaged. In addition, in the case where the specification is carried out with the visual sense of the specific character as the view, the screen is not expressed on the display device 600 as shown in FIG. 5. In this case, the world which can be viewed from the specified character is imaged. For example, in the state of FIG. 5, in the case where the visual sense of the character A is specified as the view position, the displayed image is subjected to the imaging so as to be viewed through the visual sense of the character A. That is, the panel, the measuring instrument, the monitoring screen, the operation buttons and the control stick in the cockpit, the hands and the like of the character A by which the control stick is operated, and the front window and the space which is viewed through the front window are displayed as the image. In this case, the face of the specified character A does not appear on the screen. In addition, in the case where the character B is specified, as described above, both the character C and the alien are displayed as shown in FIG. 21. In addition, in the case where the character D is specified, as described above, the characters B and C, and the alien are displayed as shown in FIG. 22.

Next, the sound information, such as the speech, the effect sound and the music, which occurs in the local spaces displayed in the produced CG image data is extracted from the sound information by the image sound processing unit 124 to produce the sound data. In this connection, only the part which is required to reproduce the sound is extracted on the basis of both the view specifying information and the scenario information. Thereafter, the scene number is set to +1 and then the processing for the subsequent scene is executed (Steps 3500 and 3600). At the time point when the last scene has ended, all the processings end. As a result, the continuous image is obtained and also the sound information accompanied therewith is obtained.

Now, the description will hereinbelow be given in brief with respect to the image which is displayed in accordance with the scenario shown in FIGS. 7A and 7B. In FIGS. 7A and 7B, there are the scenes 1 to n. In the scene 1, the whole virtual world is specified as the space to be imaged, and also the specification by the user is made wrongness. Therefore, in this case, the imaging is carried out in accordance with the standard setting of the system. That is, while different in the scene, as shown in FIG. 5, the complete view is displayed. In addition, in this scene, there is no speech and also the title music is caused to flow. In the scene 2, in accordance with the standard, the local space L1 is displayed. However, since the view is "approved", if the user specifies another space, another space thus specified is displayed. In this scene, the speech is prepared. In addition, the alarm giving the fire, and the effect sound of the announcement are produced in the local spaces L1 and L5, respectively. In the local space L2, the fire buring sound is produced as the effect sound.

In the scene 3, in accordance with the standard, the local spaces L1 and L2 are alternately displayed. But, if one of the local spaces L1 and L2 is specified by the user, only the specified local space is imaged. In this scene, in the local space L1, the motions of the character A are mainly imaged. In addition, in the local space L2, during the fire, the alien (the extraterrestrial life) X appears and also the two characters B and C appear in this local space in order to extinguish the fire. In the local space L3, the character D is carrying out the preparation for going out from the space craft and also radio-communicates with the character E. In the local space L4, the character E carries out the extravehicular work from the prior scenes on, and also radio-communicates with the character D. In the local space L5, the characters F and G watching the monitor notice the alarm from the space craft and then look over the manual. Then, in the scene 3, the speech, the music or the effect sound is present in the associated spaces.

Thereafter, a plurality of scenes continue. In this connection, the various events occur in the respective local spaces and the drama is progressed. During the progression of the drama, the timepiece common to all the spaces is used and hence the dramas in the respective local spaces are progressed synchronously with one another. Then, in the scene n, the drama draws to its close and both the complete view of the space craft and the distant view of the Earth are imaged.

Now, the description will hereinbelow be given with respect to the case where in the example of FIGS. 7A and 7B, the specification of the view is carried out with respect to the character(s). For example, in the case where the specification of the view is carried out with respect to the character B or C, the displayed space is shifted from the local space L1 to the local space L2 along with the movement of the characters B and C. On the other hand, in the case where the view is specified with respect to the character A, since the character A is not moved, the displayed local space is L1 and hence is not changed at all.

As described above, in the present invention, in the local spaces L1 to L5, the respective events occur and also the respective dramas are progressed. Then, those local dramas are assembled to construct the whole drama. In addition, the drama viewing person (the user) can specify the desired drama which is developed in the associated local space. In addition, without specification, the drama can also be viewed in the standard of the system (the local space which is previously specified in the drama). That is, the feature of the present invention is that while the drama can be viewed through the specified local space or the local space which is specified with the standard, even in the local spaces which are not specified, the respective dramas are progressed. Therefore, even if the view is specified at the arbitrary time with respect to the arbitrary local space, the drama can be viewed through the local space of interest. Therefore, the same drama can be enjoyed with the various views.

While the selection of one character out of a plurality of characters which are previously allowed is received in the above-mentioned embodiment, the present invention is not limited thereto. For example, the procedure may also be available such that the selection of a plurality of characters is received, and every character thus selected, both the position and the direction of the above-mentioned virtual camera are specified in correspondence to the associated view(s).

The above-mentioned example is the example wherein one local space or one leading character is selected. However, the present invention is not limited thereto. For example, the procedure may also be adopted such that two or more local spaces or two or more leading characters are selected and those local spaces or leading characters are displayed at the same time. FIGS. 12A and 12B, and FIGS. 13A and 13B show respective examples. In the present invention, the information processing unit 100 shown in FIG. 1 carries out, as the function of the total control unit shown in FIG. 2, the control for those display screens. That is, in the example shown in FIGS. 12A and 12B, the unit 100 operates as the screen division means, and in the example shown in FIGS. 13A and 13B, the unit 100 operates as the multiwindow control means.

Figure 12A:
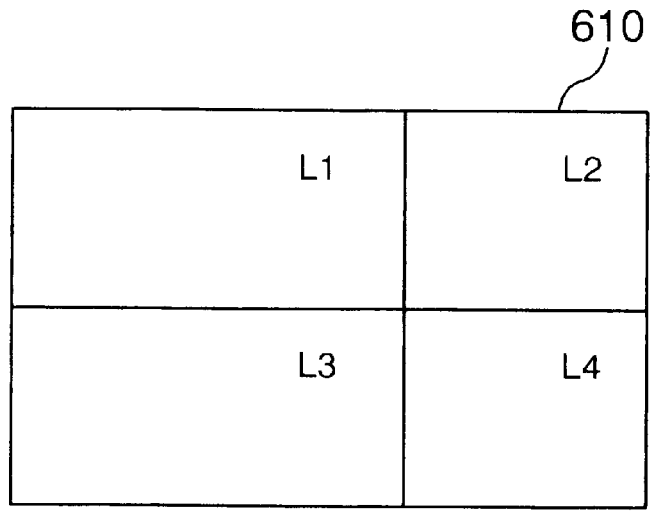
FIGS. 12A and 12B are respectively explanatory views each showing an example of the picture division display on the display device of the present embodiment.

In the example shown in FIG. 12A, the display screen 610 of the display device is divided into a plurality of display areas (four screen elements in the figure), and the specified local spaces L1, L2, L3 and L4 are displayed in the display areas, respectively. In this example, in accordance with the selected order, the large display areas are assigned to the local spaces L1 and L3, and the smaller display areas are assigned to the local spaces L2 and L4. Therefore, of course, the total display screen may be divided equally. In addition, the division is not limited to the four division, and hence two division for example may be available.

Figure 12B:
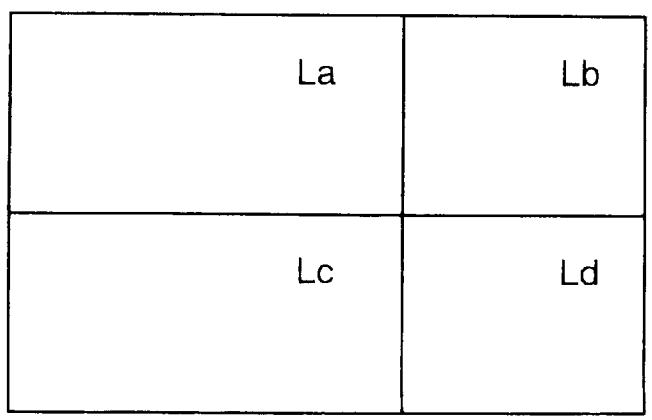

In addition, in FIG. 12B, there is shown the example of the screen division in the case where the view is specified on the basis of the characters. In the display areas shown in FIG. 12B which are obtained by the division, the local spaces where the specified characters are present are respectively displayed. That is, in the case where the characters A, B, C and D are specified, the local spaces where the characters A, B, C and D appear are displayed in the display areas La, Lb, Lc and Ld to which the characters A, B, C and D are assigned, respectively. In this case, in the case where any two or more characters (e.g., the characters A and B) of those characters are present in the same local space (e.g., the local space L1), the same image is displayed in the display areas La and Lb to which the characters A and B are assigned, respectively. Incidentally, in this case, those display areas La and Lb are combined with each other into one display area to form the large display screen.

Figure 13A:
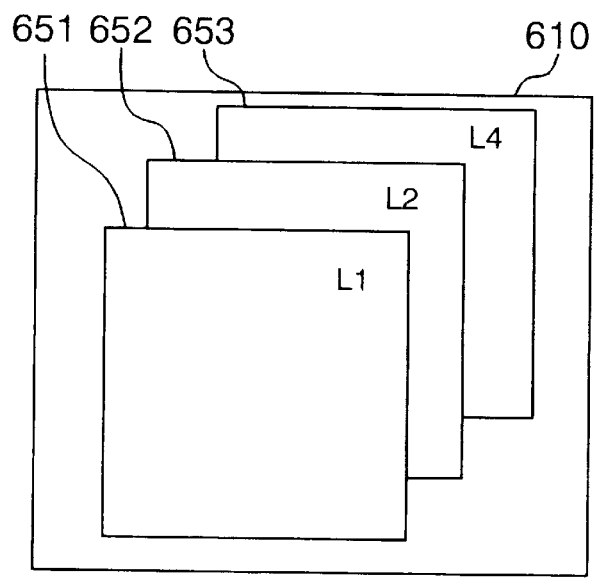
FIGS. 13A and 13B are respectively explanatory views each showing an example of the multiwindow display on the display device of the present embodiment.

In the example shown in FIG. 13A, windows 651, 652 and 653 are produced in the display screen 610 of the display device, and the selected local spaces L1, L2 and L4 are displayed on the windows 651, 652 and 653, respectively. In the figure, there is shown the state in which the local space L1 which has been selected first is displayed top priority. Of course, the window to be subjected to the priority display can be changed. In addition, both the size and the position of the window are changed to enable the images on a plurality of windows to be admired at the same time. Of course, it is to be understood that the number of windows can be changed.

Figure 13B:
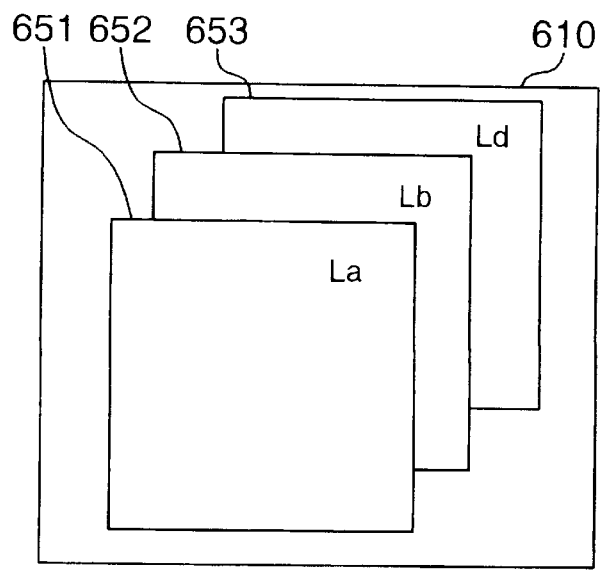

The example shown in FIG. 13B is the example in which the characters A, B and D are assigned to the windows 651, 652 and 653, respectively. In this case, the window 651 becomes the display area La of the local space where the character A appears. The window 652 becomes the display area Lb of the local space where the character B appears. In addition, the window 653 becomes the display area Lc of the local space where the character C appears. Incidentally, in the case where the specified two or more characters appear in the same local space, the same image is displayed on the display areas which are assigned to the respective characters. In this case, the procedure may also be adopted such that one of the windows having the same contents is erased, and the window thus erased and the remaining windows are integrated into one window.

Incidentally, in the case where a plurality of local spaces are displayed on the same screen in the manner as described above with respect to the sound, the sound of the local space which is displayed on the display area to be images top priority is reproduced. As a result, it is possible to prevent the sounds of the drams in a plurality of local spaces from being reproduced at the same time.

Next, another embodiment of the present invention will hereinafter be described in detail. This example is an example in which the image producing/displaying system is divided into an image information providing system and a viewing system.

Figure 14:
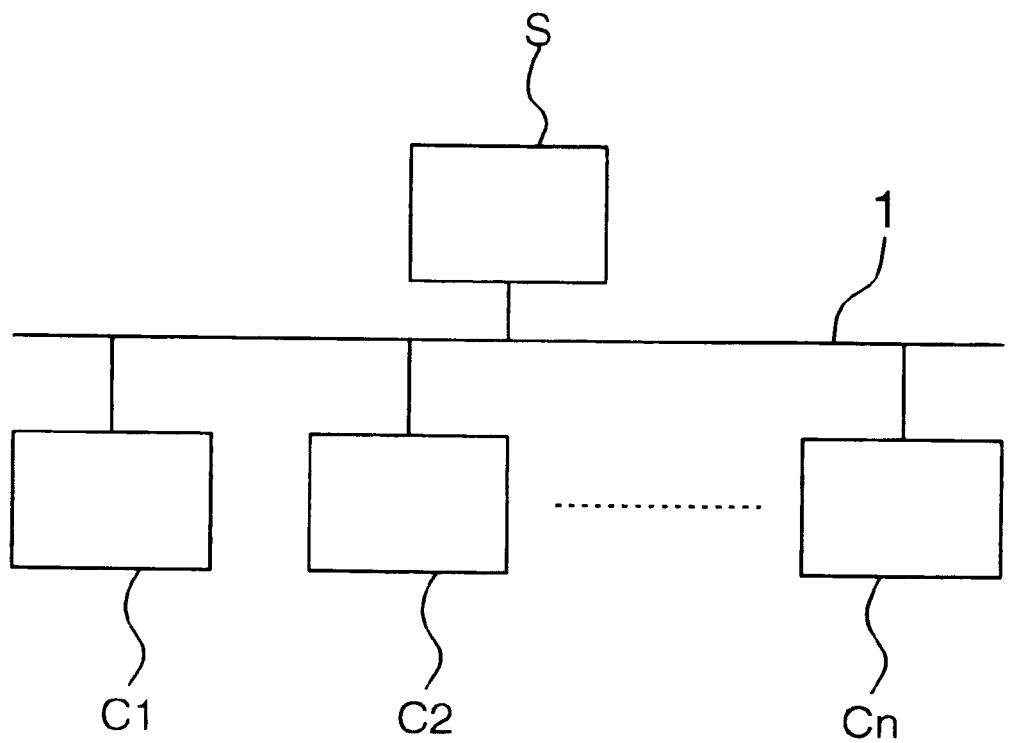
FIG. 14 is a block diagram showing the outline of an image information providing system/a viewing system constituting another embodiment of the present invention.

FIG. 14 shows a schematic view of an example in which the image producing/displaying system consists of the image information providing system and the viewing system. The present embodiment includes the image information providing system S, and one or more viewing systems C, connected to the image information providing system S, for producing an image to display the image on the basis of image information supplied from the image information providing system S. The system can be, for example, comprised of a client server system. That is, this system can be constructed in such a way that a plurality of viewing systems are provided as a plurality of clients, and the image information providing system S are provided as the server system for supplying the image information to those viewing systems.

The image information providing system S includes, but is not limited to, a storage device 1300 for storing the information which is necessary to construct the virtual world to progress the drama by the number of titles which can be put on the screen, an information processing unit 1100 for executing the processing of progressing the drama in the virtual world on the basis of the information stored in the storage device 1300 and sending the information used to image the drama of interest to the viewing system C, and a communication control unit 1900 for carrying out the communication. For the communication, the various communication media such as a LAN and the public network can be employed irrespective of the wireless type or the wire type.

The above-mentioned storage device 1300 stores, as the information required to progress the drama, individual data 1310 with respect to a plurality of characters which are virtually set as the constituent elements constructing the virtual world, can conduct themselves like the human beings, and hence are treated as the human beings, a plurality of set and properties which are treated as the objects, and a plurality of local spaces where the plurality of characters and the plurality of set and properties can be present, and also stores scenario information 1320 as the information for constructing the story along which the drama is progressed in the whole virtual world.

The above-mentioned information processing unit 1100 includes progression managing means 1110 for reading out scenario information 1320 to progress the drama in the whole space of the virtual world in accordance with the description of the scenario, and various means (not shown) for operating as the information processing unit.

The viewing system C includes, but is not limited to, a storage device 2300 for storing the information which has been sent from the image information providing system S, an information processing unit 2100 for executing the processing of imaging the drama on the basis of the information which has been sent from the image information providing system S, a display device 2600 for displaying the image which has been produced by the information processing unit 2100, an input unit 2200 for inputting the instruction to the information processing unit 2100, and a communication control unit 2900 for carrying out the communication.

The above-mentioned storage device 2300 stores therein scenario information 2320, relating to the specified local space, of the virtual world, out of the scenario information 1320 which is subjected to the progression management in the progression managing means 1110 of the information processing unit 1100 of the above-mentioned image information providing system, and individual data 1310. Now, the reason that the individual data 1310 is the same as the scenario information stored in the storage device of the image information providing system is that if the individual data is sent as the drama is progressed, the operation becomes troublesome and hence the necessary information is previously sent.

The above-mentioned information processing unit 2100 includes, but is not limited to, image producing means 2110 for referring to the individual data 1310 with respect to the information 2320, relating to the specified local space of the virtual world, out of the scenario information 1320 which is subjected to the progression management in the progression managing means 1110 to produce an image of the constituent elements of the virtual world contained therein to display the image by the display device 260, an image space appointing means 2120 for appointing the local space to be imaged in the virtual world, virtual camera specifying means 2130 for specifying both a position and a direction of a virtual camera which is virtually set when carrying out the imaging in a virtual world, and multiwindow control means 2140 for displaying a plurality of windows on a display screen by a display device 2600 to carry out the display on the windows and also controlling the priority of the display of the windows.

An input unit 2200, a sound reproducing unit 2500 and the display device 2600 are the same in construction as those shown in FIG. 1.

Incidentally, the hardware system of the wiring system C is constructed basically in the same manner as that in the system shown in FIG. 1. In addition, this is also applied to the hardware system of the image information providing system S. But, in the image information providing system S, the hardware(s) which is not used may be omitted.

The imaged space appointing means 2120 can carry out the appointment of the space by appointing any one of the constituent elements constructing the virtual world. The imaged space appointing means 2120 serves to receive the data relation to the specification from the input unit 2200 with respect to the previously allowed one of the constituent elements constructing the virtual world, and to able to determine the local space having the specified element contained therein as the specified local space.

The virtual camera specifying means 2130 serves to receive the data relating to the selection of any one of a plurality of characters, which are previously allowed, through the input unit 2200, and to specify both a position and a direction of the virtual camera in correspondence to the view of the selected character. In addition, the virtual camera specifying means 2130 serves also to receive the data relating to the selection of the characters, of a plurality of characters, which are previously allowed, through the input unit 2200 and to be able to specify both the position and the direction of the virtual camera every selected character in correspondence to the associated view.

The virtual camera specifying means 2130 has the standard specification data which is previously specified with respect to both the position and the direction of the virtual camera and hence enables the standard specification data to be selected through the input unit 2200. In addition, the virtual camera specifying means 2130 has the standard specification data which is previously specified with respect to both the position and the direction of the virtual camera, and hence in the absence of the specification from the outside, enables both the position and the direction of the virtual camera to be specified on the basis of the standard specification data.

The image producing means 2110 images the local space where the position of the virtual camera thus specified is present with that local space observed in accordance with the direction of the virtual camera thus specified. In addition, the image producing means 2110 can produce the images in accordance with the positions and the directions of a plurality of virtual cameras thus specified, and can display those images on the screen of the display device 2600 with the screen divided into a plurality of display areas.

The image producing means 2110 can display the image, which has been produced in correspondence to the standard specification data, with any one of those windows thus specified as the display area. In addition, the image producing means 2110 can display a plurality of images, which have been produced in correspondence to the positions of the virtual cameras, on the respective windows with the windows thus specified as the display areas.

As shown in FIGS. 12A and 12B or FIGS. 13A and 13B, the display device 2600 can display a plurality of display screens. In addition, the image producing means 2110 can display the images, which have been produced, on a plurality of display screens of the display device 2600 with the screen divided into a plurality of display area.

The multiwindow control means 2140 can set the windows in correspondence to the number of positions of the virtual camera which have been specified by the virtual camera specifying means 2130.

The present embodiment is such that the progression of the drama is managed in the image information providing system S, and the viewing system C receives the data relating to the drama thus managed to put that drama on the screen. Therefore, in this example, the drama of interest is put on the screen in each viewing system synchronously with the progression of the drama in the image information providing system S. The screening of the drama is basically the same as that in the above-mentioned system shown in FIG. 1.

Figure 17:
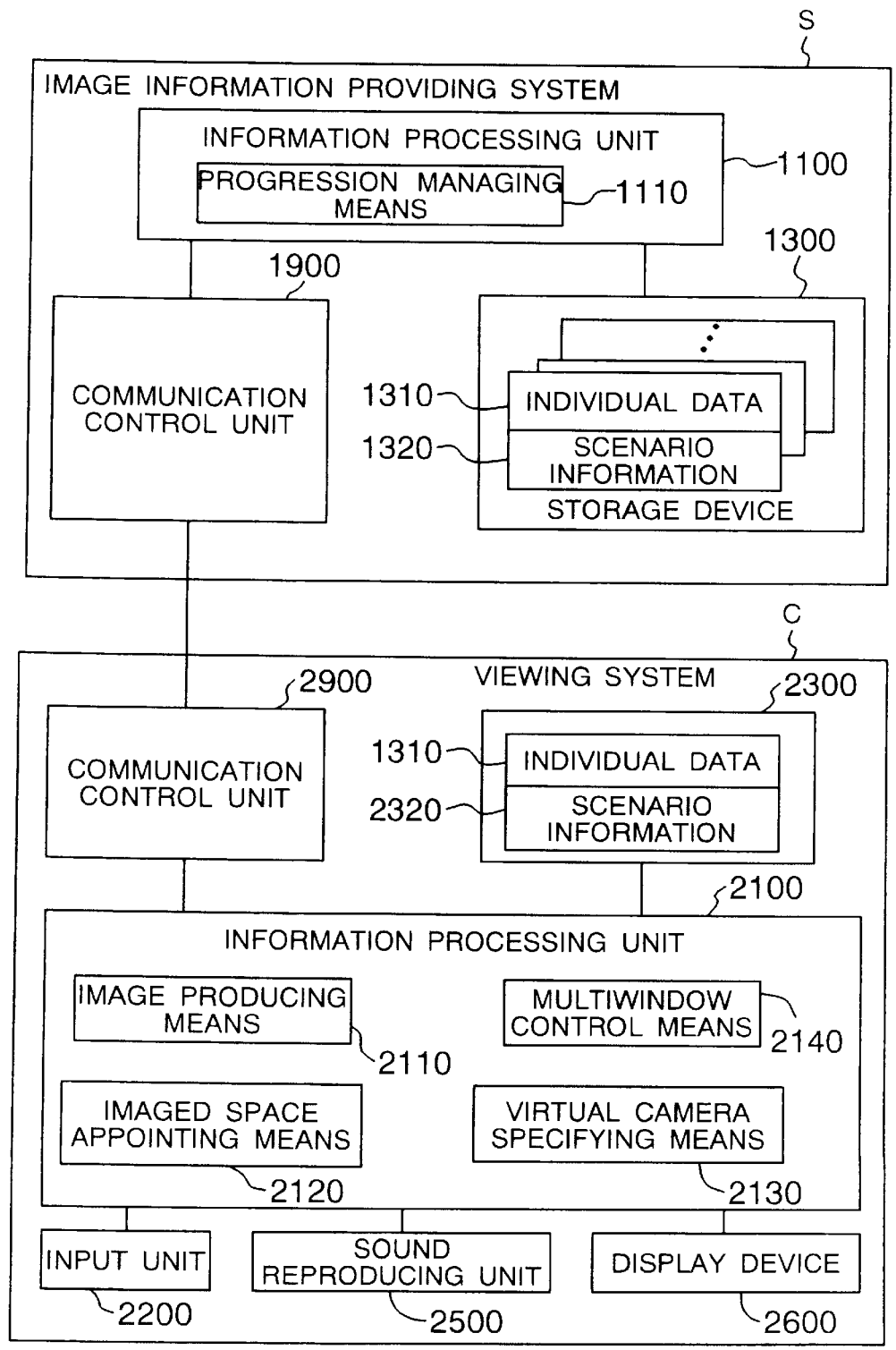
FIG. 17 is a block diagram showing configurations of both an image information providing system and a viewing system which are used in another embodiment of the present invention.

Next, still another embodiment of the present invention will hereinbelow be described in detail. The present example is different in the fact that the progression of the drama is managed by the viewing system C from the above-mentioned example shown in FIG. 17. The present example is the same in other respects as the example shown in FIG. 17. A configuration of this system is shown in FIG. 18.

Figure 18:
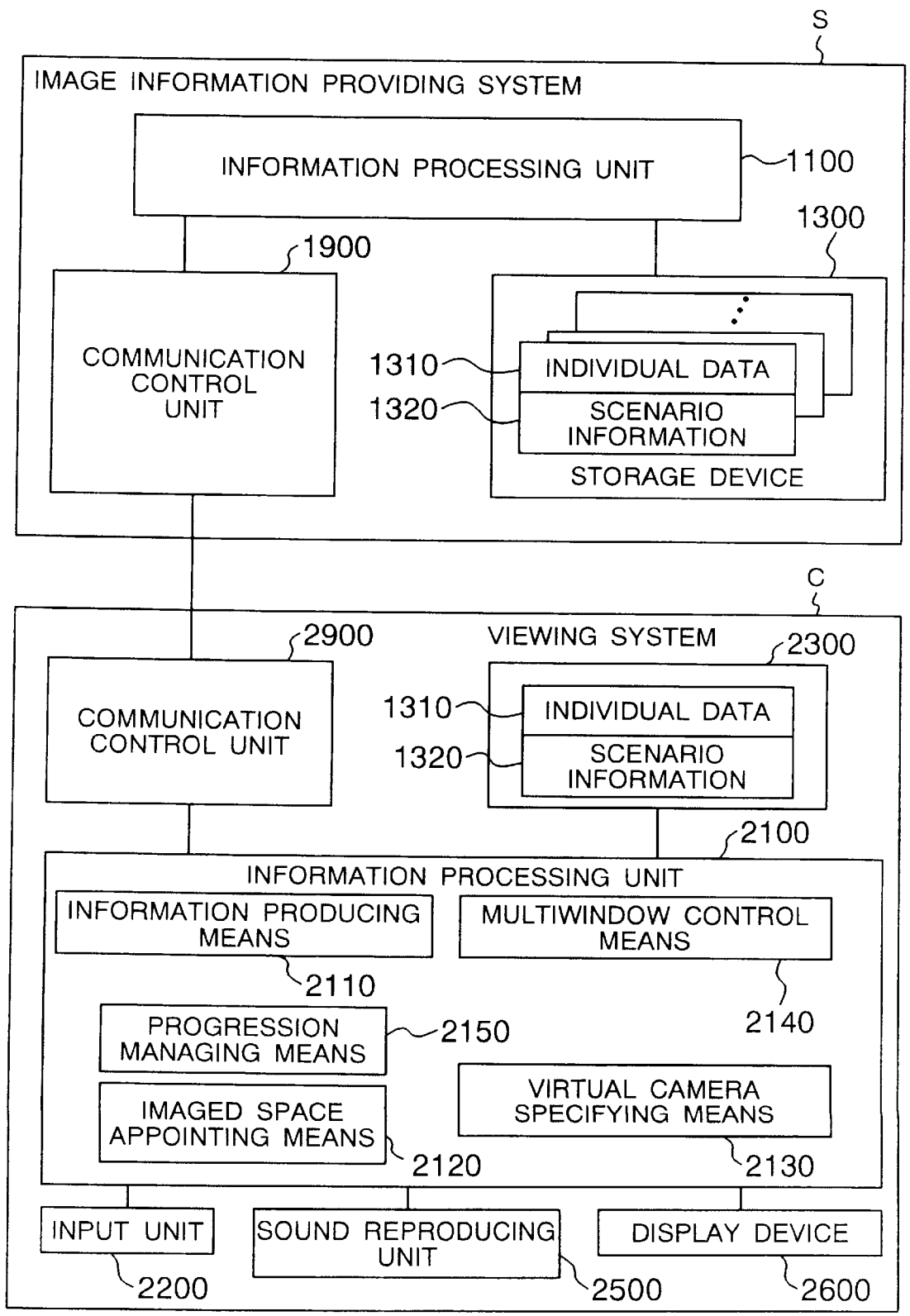
FIG. 18 is a block diagram showing configurations of both an image information providing system and a viewing system which are used in still another embodiment of the present invention.

As shown in FIG. 18, the information processing unit 1100 of the image information providing system S of the present embodiment has no progression managing means. On the other hand, the viewing system C has a progression managing means 2150. Therefore, in the present embodiment, the image information providing system S stores the various programs relating to the dramas, and when receiving a request issued from the viewing system C, sends both the individual data 1310 and the scenario information 1320 relating to the program of interest to the viewing system C. Then, the viewing system C stores both the individual data 1310 and the scenario information 1320 in the storage device 2300. Then, the progression of the drama is managed by the progression managing means 2150. Incidentally, the screening of the drama in the viewing system C is carried out in the same manner as that in the above-mentioned system shown in FIG. 1.

In the above-mentioned embodiments, there have been shown the examples in each of which the data relating to the program to be imaged is provided by the optical disc. However, the present invention is not limited thereto. For example, the data relating to the program to be imaged may be provided from another system through the communication means. In addition, the data relating to the program to be imaged may be provided by other recording medium such as the magnetic tape or the like.

The description will hereinbelow be further given with respect to other modification of the present invention. While in the above-mentioned embodiments, the form, the face, the color of the hair, the clothes and the like of the character are previously prepared to be used, the present invention is not limited thereto. All or a part of those elements may be determined by being selected by the user. In this case, for example, the library is previously prepared in which the data relating to the various candidates with respect to the form, the face, the color of the hair, the clothes and the like is stored. Then, those candidates are displayed on the display device 600 in order for the user to be able to carry out the selection.

As set forth hereinabove, according to the embodiments of the present invention, the dramas which are generally developed can be imaged from the different views independently of each other.

What is claimed is:

1. An image producing and displaying system for producing a virtual world having a plurality of local spaces, developing a drama which occurs therein, in accordance with a previously prepared scenario, and imaging the drama to display the drama, said producing and displaying system comprising:

a storage device for storing therein information which is necessary to construct said virtual world and also to cause said drama to progress;

an information processing unit for causing said drama to progress in said plurality of local spaces constituting said virtual world on a common time base to all of the local spaces and imaging said drama based on said information stored in said storage device;

a display device for displaying an image which has been produced in said information processing unit; and an input unit for specifying a local space to said information processing unit, said storage device storing individual data with respect to a plurality of characters which display human characteristics and are treated as virtual human beings, a plurality of set and properties which are treated as virtual objects and a plurality of local spaces, where said plurality of characters and said plurality of set and properties constituting said virtual world may be present, and storing scenario information for forming a story along which said drama is caused to progress in the entire virtual world, said plurality of characters, said plurality of set and properties and said plurality of local spaces being elements of said virtual world, said information processing unit including:

progression managing means for reading out said scenario information to cause said drama to progress in the entire space of the virtual world in accordance with the scenario, and image producing means for producing, by specifying at least one of said local spaces constituting said virtual world among the scenario information the progression of which is managed by said progression managing means, an image of said specified local space, and displaying the image of said specified local space on said display device.

2. An image producing and displaying system according to claim 1, wherein the individual data includes:

character feature describing information in which features and an attribute are provided for describing every character; and set and properties feature describing information in which features and an attribute are provided for describing every set and properties, wherein the scenario information includes:

event information in which an event, which is allowed to occur in a drama produced in the virtual world drama, is described;

performance describing information in which performances of a plurality of characters are described;

data of properties in which a presence state of said set and properties is described; and local space state describing information in which a structure, a background and an attribute, and a state of the local space are described, whereby specification of one of said plurality of characters by said input unit causes an image of a local space based on a view of said specified character to be produced and displayed.

3. An image producing and displaying system according to claim 2, wherein:

the event information includes data in which occurrence conditions, occurrence contents and an extended effect following the occurrence are described together with time data corresponding to the scenario;

the performance describing information includes data in which a position, behavior and attributes of each character are described together with the time data corresponding to the scenario;

the data of properties includes data in which a position, behavior and attributes of the set and properties are described together with the time data corresponding to the scenario; and the local space state describing information includes data in which the structure, the background and attributes of the local space are described together with the time data corresponding to the scenario.

4. An image producing and displaying system according to claim 2, wherein specification of one of said plurality of characters by said input unit causes an image of a local space based on a view of said specified character to be produced and displayed, said system further comprising:

a sound reproducing unit for carrying out sound reproduction;

wherein the character feature describing information includes information which represents a tone of voice of each character as an attribute;

the performance describing information further includes information in which speech of each character is described; and said sound reproducing unit produces a voice following an utterance of the speech of each character with the tone of voice, which is specified by information representing the tone of voice of each character, based on information in which the speech is described to output the voice.

5. An image producing and displaying system according to claim 2, wherein specification of one of said plurality of characters by said input unit causes an image of a local space based on a view of said specified character to be produced and displayed, said system further comprising:

a sound reproducing unit for carrying out sound reproduction;

wherein said storage device further stores a speech sound source in which the speeches of the plurality of characters are previously recorded, and identifies which of the characters are assigned to the respective speeches contained in the speech sound source for said characters;

said sound reproducing unit reproduces, when the speech of the character contained in the specified local space is specified, a recorded speech having the identifier added thereto; and the performance describing information further includes information in which the identifier for specifying the speech of the character is described.

6. An image producing and displaying system according to claim 1, wherein said information processing unit further includes individual data updating means for receiving change information from said progression managing means, when change of the individual data along with the progression of the drama is necessary, to rewrite a corresponding part of the individual data stored in said storage means whereby specification of one of said plurality of characters by said input unit causes an image of a local space based on a view of said specified character to be produced and displayed, the displayed image of the local space being changed with movement of said specified character.

7. An image producing and displaying system according to claim 1, wherein said information processing unit further includes imaged space appointing means for appointing the local space in which the imaging in the virtual world is to be carried out.

8. An image producing and displaying system according to claim 7, wherein said imaged space appointing means appoints any one of the elements included in the virtual world, to thereby specify a local space including said appointed element, and specification of one of said plurality of characters by said input unit causes an image of said specified local space based on a view of said specified character to be produced and displayed, the displayed image of the local space being changed with movement of said specified character.

9. An image producing and displaying system according to claim 8, wherein said imaged space appointing means accepts an appointment from said input unit with respect to an element, which is previously allowed, out of the elements, and determines the local space in which the appointed element is held, as the specified local space.

10. An image producing and displaying system according to claim 1, wherein said information processing unit further includes virtual camera specifying means for specifying through said input unit both a position and a direction of a virtual camera which is virtually specified when imaging in the virtual world is effected; and said image producing means carries out imaging with respect to the local space in which the specified position of the virtual camera is present, wherein said local space is observed in accordance with both the specified position and direction of said virtual camera.

11. An image producing and displaying system according to claim 10 wherein said virtual camera specifying means accepts data relating to the selection of any one of a plurality of characters which are previously allowed, through said input unit, and specifies, through said input unit, both the position and the direction of the virtual camera in correspondence to the view of the selected character.

12. An image producing and displaying system according to claim 10, wherein said virtual camera specifying means accepts data relating to the selection of the characters out of the plurality of characters which are previously allowed, through said input unit, and specifies, through said input unit, for every selected character both the position and the direction of the virtual camera in correspondence to the associated virtual vision.

13. An image producing and displaying system according to claim 9, wherein said image producing means produces, in accordance with the specified positions and directions of a plurality of virtual cameras, the respective images and displays the resultant images on said display device with a screen thereof being divided into a plurality of display areas.

14. An image producing and displaying system according to claim 13, wherein said display device has a plurality of display screens; and said image producing means displays the images, which have been produced, on said display device with the display areas being distributed to the plurality of display screens of said display device.

15. An image producing and displaying system according to claim 13, wherein said information processing unit further includes multiwindow control means for displaying a plurality of windows on the display screen of said display device to carry out the display on the windows, and controlling the priority of the display of the windows;

said multiwindow control means sets the windows in correspondence to a number of positions of said virtual cameras, the positions of said virtual cameras being specified by said virtual camera specifying means; and said image producing means displays a plurality of images, which have been produced in correspondence to the virtual camera positions, on the corresponding windows with the windows thus set as the display areas.

16. An image producing and displaying system according to claim 15, wherein said virtual camera specifying means includes default setting data which is previously set with respect to both the position and the direction of said virtual camera, and enables the default setting data to be selected through said input unit; and said image producing means displays the image, which has been produced in correspondence to the default setting data, on said display device with any one of the windows thus set as the display area.

17. An image producing and displaying system according to claim 10, wherein said virtual camera specifying means includes the default setting data which is previously set with respect to both the position and the direction of the virtual camera, and when there is no specification from the outside, sets both the position and the direction of said virtual camera based on the default setting data.

18. An image producing and displaying system according to claim 10, 11 or 12, wherein said input unit includes a remote control unit for specifying the position and a direction of said virtual camera in said local space, whereby an image of said local space as viewed from said specified virtual camera position in said specified virtual camera direction is displayed.

19. An image producing and displaying method of virtually producing a virtual world having a plurality of local spaces, developing a drama which occurs therein in accordance with a previously prepared scenario, and imaging the drama to display the drama, said method comprising the steps of:

previously storing, in a storage devices individual data with respect to a plurality of characters which display human characteristics and are treated as virtual human beings, a plurality of set and properties which are treated as virtual objects and a plurality of local spaces where the plurality of characters and the plurality of set and properties constituting said virtual world may be present, and previously storing scenario information for forming a story along which the drama is caused to progress in the entire virtual world in a storage device, said plurality of characters, said plurality of set and properties and said plurality of local spaces being elements of said virtual world;

reading out the scenario information from the storage device and causing the drama to progress in the entire space of the virtual world in accordance with the scenario information; and specifying one of said local spaces to image contents of the drama shown by the scenario information describing the drama in the specified local space by referring to the individual data stored in the storage device and to display the contents of the drama on a display device.

20. An image producing and displaying method according to claim 19, wherein the local space is specified by virtually setting a virtual camera when performing said imaging step in the virtual world and by specifying, by an input unit, both a position and a direction of said virtual camera; and said imaging step is carried out with respect to the local space where the specified position of said virtual camera is present with said local space being observed in accordance with the specified direction of said virtual camera.

21. An image producing and displaying system for virtually producing a virtual world having a plurality of local spaces, developing a drama which occurs therein along a previously prepared scenario, and imaging the drama to display the drama, said system comprising:

means for storing individual data which is used to describe both special features of a plurality of local spaces constituting said virtual world and individual special features of characters and objects of the virtual world, and for storing scenario information which is used to form a story along which the dramas with respect to a plurality of predetermined characters are caused to progress;

progression managing means for reading out the scenario information to produce the drama for every character in accordance with the description of the scenario and causing those dramas to progress synchronously with one another;

imagine character specifying means for specifying a character to be imaged in the virtual world; and image producing means for producing, by referring to the individual data with respect to a local space where the character specified by said imaging character specifying means appears out of the scenario information, progression of which is managed by the progression managing means, an image of an element of the virtual world included in the individual data as viewed from said specified character and displaying the image on a display device.

22. An image producing and displaying system for producing virtually a virtual world having a plurality of local spaces, developing a drama which occurs therein along a previously prepared scenario, and imaging the drama to display the drama, said system comprising:

storage means for storing therein information which is necessary to construct the virtual world and to the drama to progress;

information processing means for causing the drama to progress in said plurality of local spaces constituting the virtual world on a time base common to all of said local spaces and imaging the drama based on the information stored in said storage means;

output means for displaying the image which has been produced in said information processing means; and input means for specifying a local space to said information processing means, said storage means storing individual data with respect to a plurality of characters which display human characteristics and are treated as virtual human beings, a plurality of set and properties which are treated as virtual objects and a plurality of local spaces where the plurality of characters and the plurality of sets of properties constituting said virtual world may be present, and storing scenario information for forming a story along which the drama is caused to progress in the entire virtual world, said plurality of characters, said plurality of set and properties and said plurality of local spaces being elements of said virtual world, said information processing unit including:

progression managing means for reading out the scenario information to cause the drama to progress in the entire space of the virtual world in accordance with the scenario, and image producing means for producing, by specifying at least one of said local spaces constituting said virtual world among the scenario information the progression of which is managed by the progression managing means, an image of said specified local space, and displaying the image of said specified local space at said output means.

* * * * *